(12) United States Patent
Toda

(10) Patent No.: US 8,698,954 B2
(45) Date of Patent: Apr. 15, 2014

(54) IMAGE PROCESSING METHOD, IMAGE PROCESSING APPARATUS AND IMAGE PROCESSING PROGRAM

(75) Inventor: Masato Toda, Tokyo (JP)

(73) Assignee: NEC Corporation, Tokyo (JP)

( * ) Notice: Subject to any disclaimer, the term of this patent is extended or adjusted under 35 U.S.C. 154(b) by 701 days.

(21) Appl. No.: 12/920,388

(22) PCT Filed: Mar. 18, 2009

(86) PCT No.: PCT/JP2009/055321
§ 371 (c)(1),
(2), (4) Date: Aug. 31, 2010

(87) PCT Pub. No.: WO2009/116586
PCT Pub. Date: Sep. 24, 2009

(65) Prior Publication Data
US 2011/0007211 A1    Jan. 13, 2011

(30) Foreign Application Priority Data

Mar. 21, 2008  (JP) ................................. 2008-072973

(51) Int. Cl.
*H04N 7/01*    (2006.01)

(52) U.S. Cl.
USPC ........................................................ 348/452

(58) Field of Classification Search
USPC ......... 348/441, 451, 452, 454, 222.1, 207.99, 348/469, 448; 345/76–86, 690–693, 104, 345/204
See application file for complete search history.

(56) References Cited

U.S. PATENT DOCUMENTS

| 5,619,273 | A | 4/1997 | Suglyama | |
|---|---|---|---|---|
| 7,307,606 | B1 * | 12/2007 | Yamazaki et al. | 345/77 |
| 7,333,149 | B2 * | 2/2008 | Choi | 348/441 |
| 7,379,120 | B2 * | 5/2008 | Kondo et al. | 348/448 |
| 8,174,614 | B2 * | 5/2012 | Asamura et al. | 348/448 |
| 2005/0024532 | A1 * | 2/2005 | Choi | 348/441 |

(Continued)

FOREIGN PATENT DOCUMENTS

| JP | 04-355581 | 12/1992 |
|---|---|---|
| JP | 08-130716 | 5/1996 |

(Continued)

OTHER PUBLICATIONS

International Search Report, PCT/JP2009/055321, Jun. 23, 2009.

(Continued)

*Primary Examiner* — Aung S Moe
(74) *Attorney, Agent, or Firm* — Young & Thompson

(57) ABSTRACT

A method includes the step of: calculating a synthesis ratio based on a motion estimation reliability being decided by integrating a first motion estimation reliability, a second motion estimation reliability, and a third motion estimation reliability, the first motion estimation reliability being decided by a difference absolute value between pixels within an interlaced image at a preceding time and pixels within an interlaced image at a subsequent time, used to calculate a pixel value interpolated when the second progressive image is generated, the second motion estimation reliability being decided by the widths of areas of interlaced images at preceding and subsequent times used to calculate the pixel values to be interpolated, the third motion estimation reliability being decided by a combination of a line luminance change of an interlaced image at a preceding time and a line luminance change of an interlaced signal at a subsequent time within the area.

36 Claims, 11 Drawing Sheets

(56) References Cited

U.S. PATENT DOCUMENTS

| | | | |
|---|---|---|---|
| 2005/0270418 A1* | 12/2005 | Kondo et al. | 348/452 |
| 2007/0053013 A1* | 3/2007 | Takahashi | 358/474 |
| 2008/0151103 A1* | 6/2008 | Asamura et al. | 348/448 |
| 2008/0204592 A1* | 8/2008 | Jia et al. | 348/402.1 |
| 2010/0085479 A1* | 4/2010 | Aokage | 348/452 |
| 2010/0103313 A1* | 4/2010 | Matsubara | 348/452 |
| 2010/0123825 A1* | 5/2010 | Shao | 348/452 |

FOREIGN PATENT DOCUMENTS

| | | |
|---|---|---|
| JP | 3677165 | 5/2005 |
| JP | 2005-333254 | 12/2005 |
| JP | 2006-174123 | 6/2006 |
| JP | WO2006/126169 | 11/2006 |

OTHER PUBLICATIONS

"Deinterlacing—an overview" De Haan, G. Bellers, E.B., Proceedings of the IEEE, vol. 86, Issue 9, Sep. 1998 pp. 1839-1857.

Masato Toda, Masato Tsukada, Akira Inoue, "Shuhen Ryoiki no Kido Kenda ni Motozuka Edge Tekiogata Interlace-Progressive Henkanho", Dai 6 Kai Forum on Information Technology, Aug. 22, 2007, vol. FIT 2007 Ippan Koen Ronbunshu separate vol. 3, pp. 271 to 272.

* cited by examiner

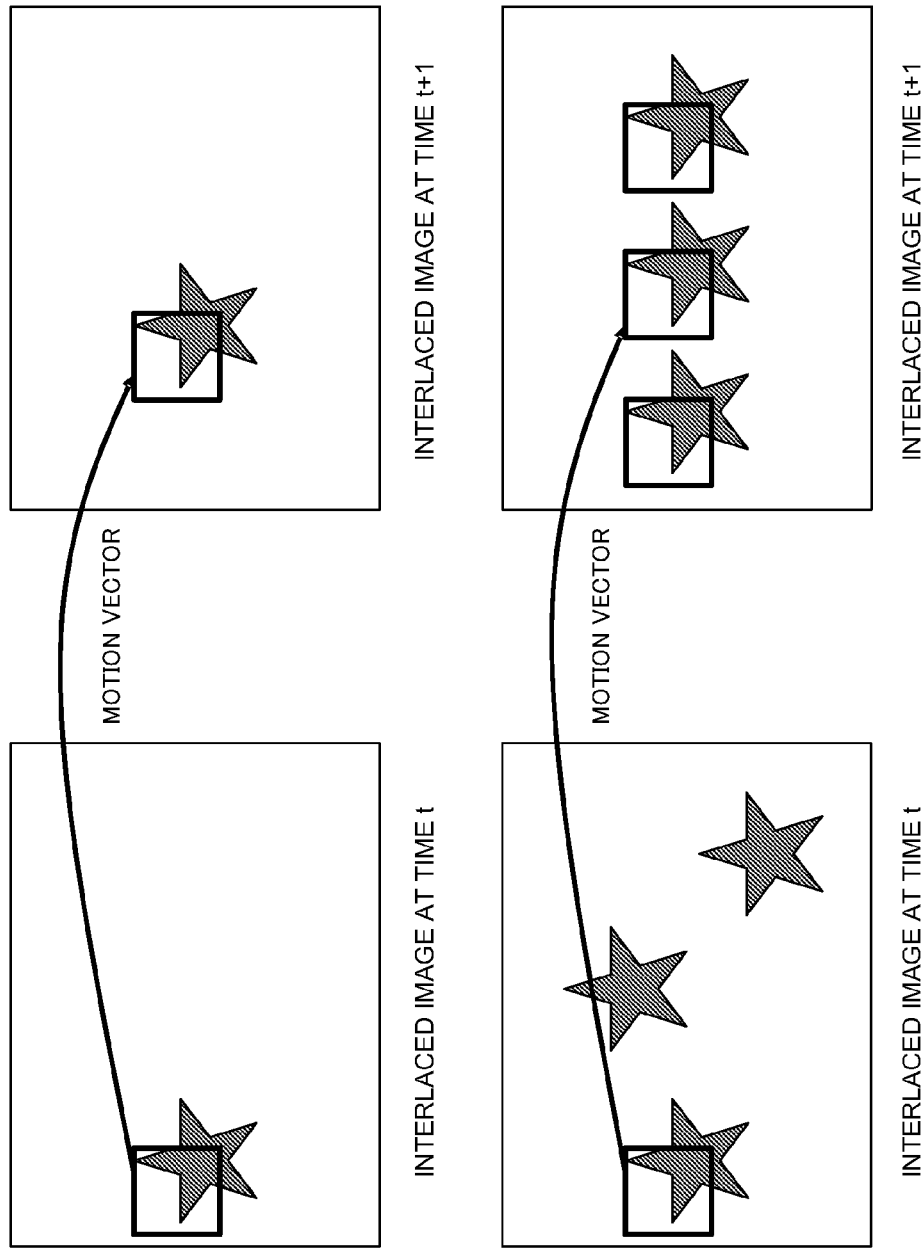

IMAGE PROCESSING METHOD, IMAGE PROCESSING APPARATUS AND IMAGE PROCESSING PROGRAM

TECHNICAL FIELD

The present invention relates to an image processing method, an image processing apparatus, and an image processing program, each which generates progressive images from interlaced images via the interlace to progressive conversion.

BACKGROUND OF THE RELATED ART

Videos distributed via TV broadcast and Videos stored on recording media, such as video tapes, DVDs, or the like, are often interlaced videos in which even field images and odd field images decimated every other line in the vertical direction from a progress video are interleaved. The relation between original progressive image F(t) and interlaced image Fi(t) at the time t is expressed by the following equation (1).

[Equation 1]

$$Fi(x, y, t) = \begin{cases} F(x, y, t) & \text{if}(y \bmod 2 = t \bmod 2) \\ \text{Null} & \text{else} \end{cases} \quad (1)$$

where F(x,y,t) and Fi(x,y,t) represent pixel values F(t) and Fi(t) on the coordinate (x, y), respectively. y mod x is an arithmetic symbol representing the remainder of y/x.

However, video display units, such as LCDs or plasma displays, display progressive videos. In order to display interlaced videos on such video display units, progressive images must be generated by restoring Null pixels on decimated lines of interlaced images, expressed by the equation (1), via interpolation. The interpolation process is generally called as the interlacing to progressive conversion (IP conversion, De-interlacing). Hereinafter, Null pixels restored via interpolation are called as interpolated pixels.

As one of IP converting methods, there is the motion compensation IP conversion. One of motion compensation IP conversion methods can provide high performance interpolation execution. That is, when the progressive image Fp(t) at the time t is restored from an interlaced image, a first progressive image Fp1(t) calculated based on pixel values around respective interpolated pixels at the time t within an interlaced image Fi(t) is synthesized with a second progressive image Fp2(t), obtained by utilizing motion vectors by which respective interpolated pixels are associated with the corresponding pixels within interlaced image at other time and calculating based on pixel values of the corresponding pixels within an interlaced image at other time. Hereinafter, the method of calculating a first progressive image from an interlaced image at the same time is called as a first progressive image calculating method. The method of using motion vectors and calculating a second progressive image based on image pixels at other time is called as a second progressive image calculating method.

As the first progressive image calculating method, there are a simple linear interpolation method, expressed by the equation (2), and an edge adaptive interpolation method, expressed by the equation (3), (non-patent document 1 and patent document 1). Fp1(x,y,t) is the pixel value of an interpolated pixel at the coordinate (x,y) in the first progressive image Fp1(t) at the time t. m in the equation (3) is p minimizing the equation (4) within a predetermined range $-\Phi \leq p \leq \Phi$. Hereinafter, the range $-\Phi \leq p \leq \Phi$ is called as a search range $\Phi$. Moreover, referring to the non-patent document 2, the changes in luminance of the upper and lower lines within the search range by the edge adaptive interpolation method in respective interpolated pixels based on the luminance conversion of peripheral pixels are classified into five patterns, as shown in FIG. 8. That is, five patterns includes (1) one characteristic being flat, (2) both characteristics monotonously increasing and decreasing in the same direction, (3) both characteristics being convex in the same direction, (4) one characteristic decreasing and increasing and the other characteristic being convex, (5) others. The search range $\Phi$ changes adaptively to the maximum range such that the pattern of a change in luminance of the upper or lower line within the search range belongs to any one of the patterns (1) to (4). Hereinafter, patterns in luminance change upper and lower lines within a classified search range are called as luminance change patterns of upper and lower lines.

[Equation 2]

$$Fp1(x, y, t) = \frac{Fi(x, y-1, t) + Fi(x, y+1, t)}{2} \quad (2)$$

[Equation 3]

$$Fp1(x, y, t) = \frac{Fi(x-m, y-1, t) + Fi(x+m, y+1, t)}{2} \quad (3)$$

[Equation 4]

$$Sub(p) = |Fi(x-p, y-1, t) - Fi(x+p, y+1, t)| \quad (4)$$

The second progressive image calculation method utilizes motion vectors establishing correspondences between respective interpolated pixels and related pixels within an interlaced image at other time and calculates a second progressive image based on the pixel values of the corresponding pixels within an interlaced image at other time.

As to motion vector calculation, there are a block matching method and a gradient method. When a motion vector in the interpolated pixel on the coordinate (x,y) at the time t is (dx,dy), the pixel value Fp2(x,y,t) of the second progressive image in the interpolated pixel is calculated by the equation (5). Moreover, there is the method of detecting the horizontal motion dx' and calculating the pixel value of the interpolated pixel (x,y), according to the equation (6).

[Equation 5]

$$Fp2(x, y, t) = \frac{Fi(x-dx, y-dy, t-1) + Fi(x+dx, y+dy, t+1)}{2} \quad (5)$$

[Equation 6]

$$Fp2(x, y, t) = \frac{Fi(x-dx', y, t-1) + Fi(x+dx', y, t+1)}{2} \quad (6)$$

When a motion vector can be obtained accurately, the second progressive image to be calculated using the motion vector is generated with high interpolation accuracy.

However, in the interlacing to progressive conversion, it is difficult generally to obtain the motion vectors for all interpolated pixels accurately. For example, when a background object, shielded by a foreground object, appears due to a movement of the foreground object, the movement of the background object at appearance time cannot be obtained accurately because the location of the background object before appearance cannot be known. Therefore, the reliability of motion vector estimation is calculated. The first progressive image and the second progressive image are synthesized based on the motion estimation reliability. In this case, if the motion vector estimation reliability is high, the synthesis ratio of the second progressive image is set to be high and if the motion vector estimation reliability is low, the synthesis ratio of the second progressive image is set to be low. Hereinafter, the reliability of motion vector estimation is called as motion estimation reliability.

Referring to, for example, the patent document 2, the reliability of motion vector estimation is calculated based on the sum of difference absolute values (SAD, Sum of Absolute Differences). The sum is one factor representing the similarity between an interested interpolated pixel and the corresponding pixel, used when a motion vector is obtained through the block matching method. In the patent document 2, the motion vector estimation reliability is higher when the sum of difference absolute values is small while is smaller when the sum of difference absolute values is large.

An image processing apparatus for performing motion compensation IP conversion related to the present invention will be explained by referring to FIG. 10. FIG. 10 is a block diagram illustrating the configuration of an image processing apparatus that performs motion compensation IP conversion, according to the present invention. Referring to FIG. 10, the image processing apparatus 1 includes a first progressive image calculation means 11, a second progressive image calculation means 12 and a progressive image synthesis means 13. The image processing apparatus receives the interlaced images Fi(t−1), Fi(t) and Fi(t+1) at the time t−1, t, and t+1, respectively, and outputs the progressive image Fp(t) at the time t.

The first progressive image calculation means 11 calculates the first progressive image using the first progressive image calculation method.

The second progressive image calculation means 12 calculates the second progressive image using the second progressive image calculation method and outputs the sum of the second progressive image and the sum of difference absolute values.

The progressive image synthesis means 13 synthesizes the first progressive image and the second progressive image based on the motion estimation reliability calculated based on the sum of difference absolute values.

Patent document 1: Japanese patent Laid-open publication No. Hei4-355581
Patent document 2: Japanese patent Laid-open publication No. 2006-174123
Non-patent document 1: "Deinterlacing—an overview", De Haan, G, Betters, E. B, Proceedings of the IEEE, Volume 86, Issue 9, September 1998 page(s): 1839-1857
Non-patent document 2: "Edge adaptive interlace to progressive conversion method based on a brightness change about peripheral area", Toda, Tukada, and Inoue, Sixth Information Science Technology Forum, 1-034, 2007

DISCLOSURE OF THE INVENTION

Problems to be Solved by the Invention

In the method related to the present invention, the reliability of motion vector estimation is calculated by using the sum of difference absolute values. However, the motion estimation reliability cannot be obtained accurately by merely using information about the sum of difference absolute values.

Let us now consider, for example, obtaining the motion estimation reliability of the square area, at the time t, within an interlaced image, seen in each of on the left side of the top and the left side of the bottom in FIG. 11. FIG. 11 shows a progressive image, but actually an interlaced image, to make understandable the problem on the technique related to the present invention. Even in either motion vector seen on the top and bottom in FIG. 11, the sum of difference absolute values becomes 0. As a result, the reliability of the motion vector estimation is maximized. However, in comparison, the top view includes only one similar area but the bottom view includes plural similar areas. Generally speaking, when plural similar areas exist, it is difficult to specify the area having a correct corresponding relation in motion vector estimation. For that reason, it is desirable that when a large number of similar areas exist, the reliability of motion vector estimation becomes lower.

However, in the related technique implemented based on the sum of difference absolute values, the same value is output even when plural similar areas exist. For that reason, the related technique may process even erroneous motion vector as a motion vector of high reliability, thus, as a result, outputting low quality progressive images.

As described above, because of the program on the motion estimation reliability to be calculated, the conventional technology cannot provide an image processing apparatus that output high-quality progressive images.

The present invention is made to overcome the problems described above. An object of the present invention is to provide an image processing method, apparatus and program, each generating high-quality progressive images from plural interlaced images.

Means to Solve the Problems

According to the present invention that can solve the above mentioned problem, an image processing method comprises the step of calculating a synthesis ratio based on a motion estimation reliability. The synthesis ratio is used when a first progressive image generated from an interlaced image at a certain time and a second progressive image generated from plural interlaced images at a time different from the certain time are synthesized. The motion estimation reliability is decided by integrating a first motion estimation reliability, a second motion estimation reliability, and a third motion estimation reliability. The first motion estimation reliability is decided by a difference absolute value between pixels within an interlaced image at a preceding time and pixels within an interlaced image at a subsequent time, used to calculate a pixel value interpolated when the second progressive image is generated. The second motion estimation reliability is decided by the widths of areas of interlaced images at preceding and subsequent times used to calculate the pixel values to be interpolated. The third motion estimation reliability is decided by a combination of a line luminance change of an interlaced image at a preceding time and a line luminance change of an interlaced image at a subsequent time within the area.

According to the present invention, an image processing method comprises the step of calculating a synthesis ratio based on a motion estimation reliability. The synthesis ratio is used when a first progressive image generated from an interlaced image at a certain time and a second progressive image generated from plural interlaced images at a time different from the certain time are synthesized. The motion estimation reliability is decided by the widths of areas of plural interlaced images at a different time used to calculate a pixel value to be interlaced when is second progressive image is generated.

According to the present invention, an image processing method comprises the step of calculating a synthesis ratio based on a motion estimation reliability. The synthesis ratio is used when a first progressive image generated from an interlaced image at a certain time and a second progressive image generated from plural interlaced images at a time different from the certain time are synthesized. The motion estimation reliability is decided by either a line luminance change of an interlaced image at the preceding time or a line luminance change of an interlaced image at a subsequent time in the area.

According to the present invention, an image processing apparatus comprises an image synthesis means for calculating a synthesis ratio based on a motion estimation reliability and synthesizing a first progressive image and a second progressive image based on the synthesis ratio. The synthesis ratio is used to synthesize a first progressive image generated from an interlaced image at a certain time and a second progressive image generated from plural interlaced images at a time different from the certain time. The motion estimation reliability is decided by integrating a first motion estimation reliability, a second motion estimation reliability, and a third motion estimation reliability. The first motion estimation reliability is decided by a difference absolute value between pixels within an interlaced image at a preceding time and pixels within an interlaced image at a subsequent time used to calculate an pixel value interlaced when the second progressive image is generated. The second motion estimation reliability is decided by widths of areas of interlaced images at the preceding and subsequent times used to calculate the pixel value to be interlaced. The third motion estimation reliability is decided by a combination of a line luminance change of an interlaced image at a preceding time and a line luminance change of an interlaced image at a subsequent time within the area.

According to the present invention, an image processing apparatus comprises an image synthesis means for calculating a synthesis ratio based on a motion estimation reliability and synthesizing a first progressive image and a second progressive image based on the synthesis ratio. The synthesis ratio is used when the first progressive image generated from an interlaced image at a certain time and the second progressive image generated from plural interlaced images at a time different from the certain time are synthesized. The motion estimation reliability is decided by the widths of areas of plural interlaced images at a different time used to calculate a pixel value interpolated when the second progressive image is generated.

According to the present invention, an image processing apparatus comprises an image synthesis means for calculating a synthesis ratio based on a motion estimation reliability and synthesizing a first progressive image and a second progressive image based on the synthesis ratio. The synthesis ratio is used when the first progressive image generated from an interlaced image at a certain time and the second progressive image generated from plural interlaced images at a time different from the certain time are synthesized. The motion estimation reliability is decided by either a line luminance change of an interlaced image at a preceding time or a line luminance change of an interlaced image at a subsequent time within the area.

According to the present invention, a program comprises the step of directing an information processing apparatus to execute a synthesis ratio calculation process of calculating a synthesis ratio based on a motion estimation reliability. The synthesis ratio is used when a first progressive image generated from an interlaced image at a certain time and second progressive image generated from plural interlaced images at a time different from the certain time are synthesized. The motion estimation reliability is decided by integrating a first motion estimation reliability, a second motion estimation reliability and a third motion estimation reliability. The first motion estimation reliability is decided from a difference absolute time between pixels within an interlaced image at a preceding time and pixels within an interlaced image at a subsequent time, used to calculate a pixel value interpolated when is second progressive image is generated. The second motion estimation reliability is decided from the widths of areas of interlaced images at preceding and subsequent times used to calculate the pixel value to be interpolated. The third motion estimation reliability is decided by combining a line luminance change of an interlaced image at a preceding time and a line luminance change of an interlaced image at a subsequent time within the area.

According to the present invention, a program comprises the step of directing an information processing apparatus to execute a synthesis ratio calculation process of calculating a synthesis ratio based on a motion estimation reliability. The synthesis ratio is used when a first progressive image generated from an interlaced image at a certain time and a second progressive image generated from plural interlaced images at a time different from the certain time are synthesized. The motion estimation reliability is decided by the widths of areas of plural interlaced images at a different time used to calculate pixel values interlaced when the second progressive image is generated.

According to the present invention, a program comprises the step of directing an information processing apparatus to execute a synthesis ratio calculation process of calculating a synthesis ratio based on a motion estimation reliability. The synthesis ratio is used when a first progressive image generated from an interlaced image at a certain time and a second progressive image generated from plural interlaced images at a time different from the certain time are synthesized. The motion estimation reliability is decided by either a line luminance change of an interlaced image at a preceding time or a line luminance change of an interlaced image at a subsequent time within the area.

Effect of the Invention

According to the present invention, a high quality progressive image can be generated from plural interlaced images.

BRIEF DESCRIPTION OF THE DRAWINGS

FIG. 11 is a diagram supplementarily explaining problems in the related technology.

EXPLANATION OF SYMBOLS

Figure 1:
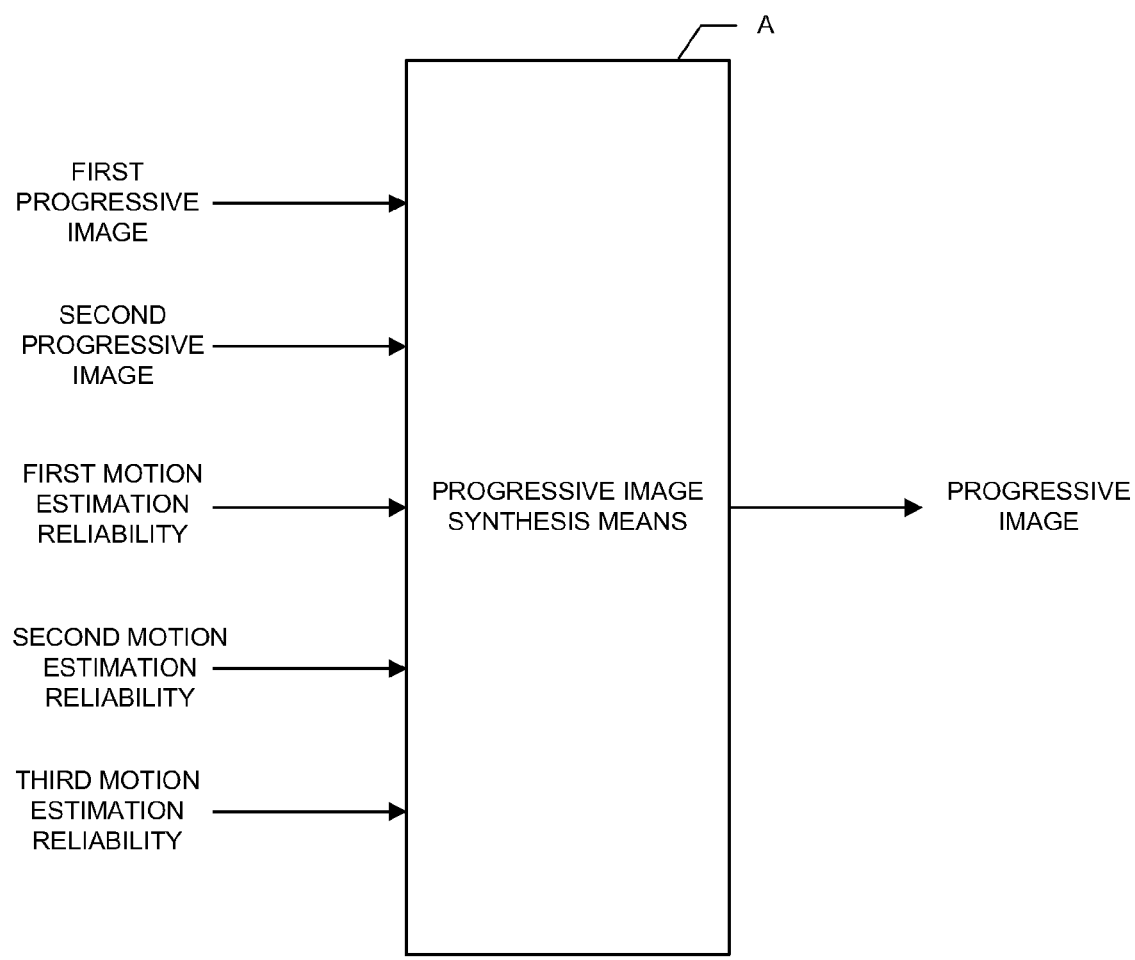
FIG. 1 is a block diagram illustrating a best mode configuration for carrying out the present invention.

A Progressive image synthesis means
1 Image processing apparatus
11 First progressive image calculation means
12 Second progressive image calculation means
13 Progressive image synthesis means
2 Image processing apparatus according to the present invention
22 Second progressive image calculation means
23 Progressive image synthesis means
231 First motion estimation reliability calculation means
232 Second motion estimation reliability calculation means
233 Third motion estimation reliability calculation means
234 Motion estimation reliability integration means
235 Synthesis means
3 Image processing apparatus according to the present invention
31 First progressive image calculation means
33 Progressive image synthesis means
331 First motion estimation reliability calculation means
332 Second motion estimation reliability calculation means
333 Third motion estimation reliability calculation means
334 Motion estimation reliability integration means
335 Synthesis means
336 First interpolation reliability calculation means
337 Second interpolation reliability calculation means
338 Third interpolation reliability calculation means
339 Interpolation reliability integration means

BEST MODE FOR CARRYING OUT THE INVENTION

An embodiment of the present invention will be explained below. The present embodiment includes a progressive image synthesis means A for synthesizing a first progressive image generated from an interlaced image at a certain time and a second progressive image generated from plural interlaced images at a time different the certain time, as shown in FIG. 1.

The progressive image synthesis means A receives the first progressive image and the second progressive image.

The progressive image synthesis means A receives a first motion estimation reliability decided by a difference absolute value between pixels in an interlaced image at a preceding time and pixels in an interlaced image at a subsequent time, used to calculate pixel values interpolated when the second progressive image is generated.

The progressive image synthesis means A receives a second motion estimation reliability decided by the sizes of areas of interlaced images at the preceding and subsequent time used to calculate the pixel value to be interpolated.

The progressive image synthesis means A receives a third motion estimation reliability decided by a combination of a line luminance change of an interlaced image at the preceding time and a line luminance change of an interlaced image at the subsequent time, within the area.

The progressive image synthesis means A calculates a synthesis ratio used to synthesize a first progressive image and a second progressive image, based on a motion estimation reliability decided by integrating a first motion estimation reliability, a second motion estimation reliability, and a third motion estimation reliability. The first progressive image and the second progressive image are synthesized based on the synthesis ratio.

The present embodiment will be explained below in detail.

First Embodiment

Next, a best mode for carrying the present invention will be explained in detail by referring to the attached drawings.

Figure 2:
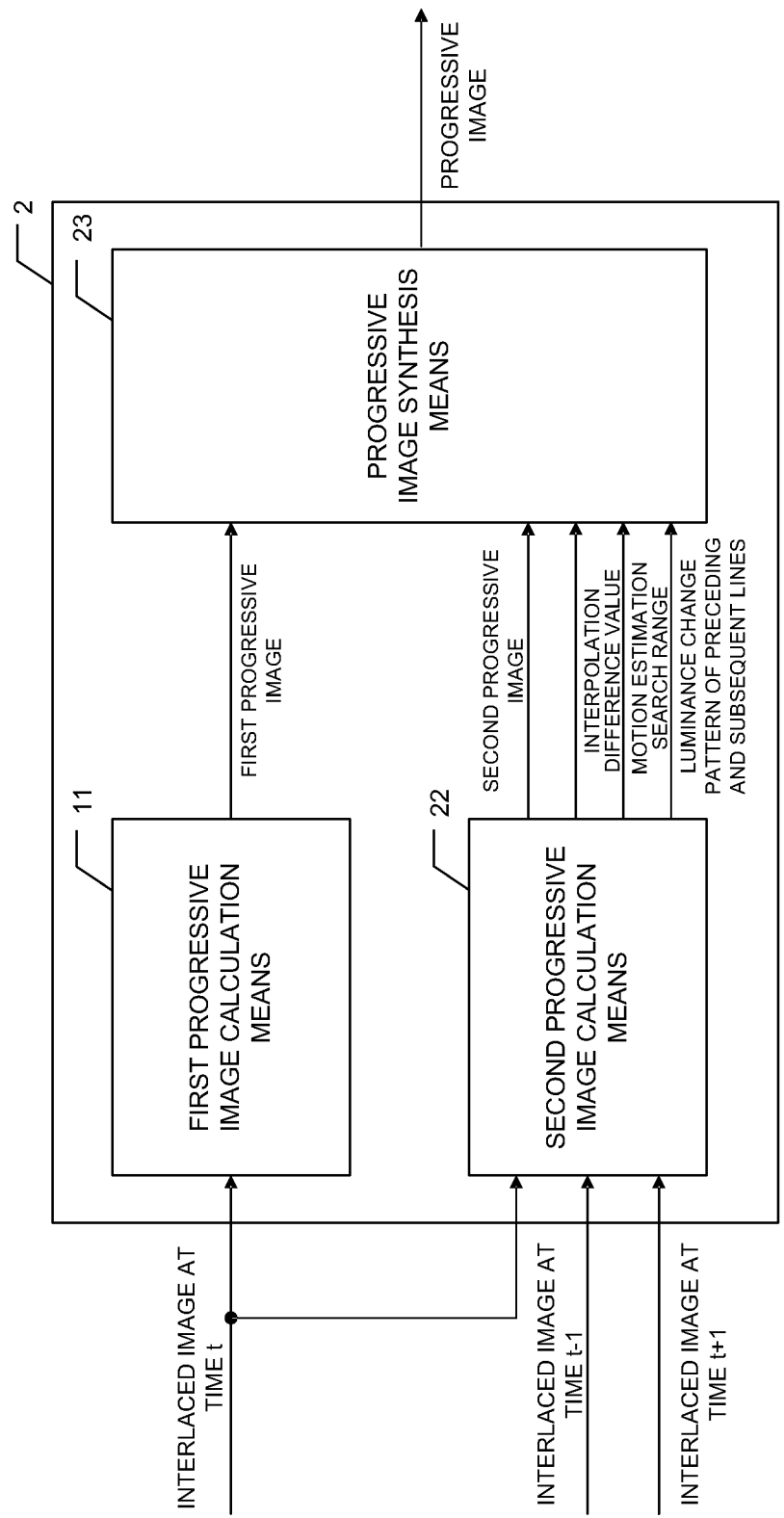
FIG. 2 is a block diagram illustrating a best mode configuration for carrying out a first invention.

FIG. 2 is a block diagram illustrating the configuration of the image processing apparatus 2 according to the first embodiment of the present invention. The image processing apparatus 2 consists of a first progressive image calculation means 11, a second progressive image calculation means 22, and a progressive image synthesis means 23. The image processing apparatus 2 differs from the image processing apparatus 1 structurally in the second progressive image calculation means 22 and the progressive image synthesis means 23. The operation of the second progressive image calculation means 22 and the progressive image synthesis means 23 will be explained below in detail.

The second progressive image calculation means 22 receives interlaced images at the time t−1, t, and t+1, respectively, and calculates the pixel value Fp2(x,y,t) of an interpolated image on the coordinate (x,y) and at the time t, using the equation (7), to obtain a second progressive image.

[Equation 7]

$$Fp2(x, y, t) = \frac{Fi(x - n, y, t - 1) + Fi(x + n, y, t + 1)}{2} \quad (7)$$

where n in the equation (7) is q minimizing the equation (8) in the range −ρ≤q≤ρ. Hereinafter, the range −ρ≤q≤ρ is called as a motion estimation search range ρ.

The second progressive image calculation means 22 applies the first progressive image generating method, disclosed in the non-patent document 2. The second progressive image calculation means 22 changes adaptively the motion estimation search range ρ in each interpolated pixel to a maximum range in such a way that line luminance changes at the preceding and subsequent times within the range comply with any one of four patterns. As the four patterns, there are (1) one characteristic being flat, (2) both characteristics decreasing or increasing monotonously in the same direction, (3) both characteristics being convex in the same direction, and (4) one characteristic decreasing or increasing and the other characteristic being convex. Hereinafter, luminance change patterns at preceding and subsequent times, classified, are called as preceding/subsequent line luminance change patterns.

[Equation 8]

$$Sub2(q) = |Fi(x-q,y,t-1) - Fi(x+q,y,t+1)| \quad (8)$$

The second progressive image calculation means 22 also outputs difference values of pixels (interpolation difference values) used for interpolation, motion estimation search ranges, and luminance change patterns of preceding and subsequent lines as well as second progressive images, for each interpolated pixel.

Figure 3:
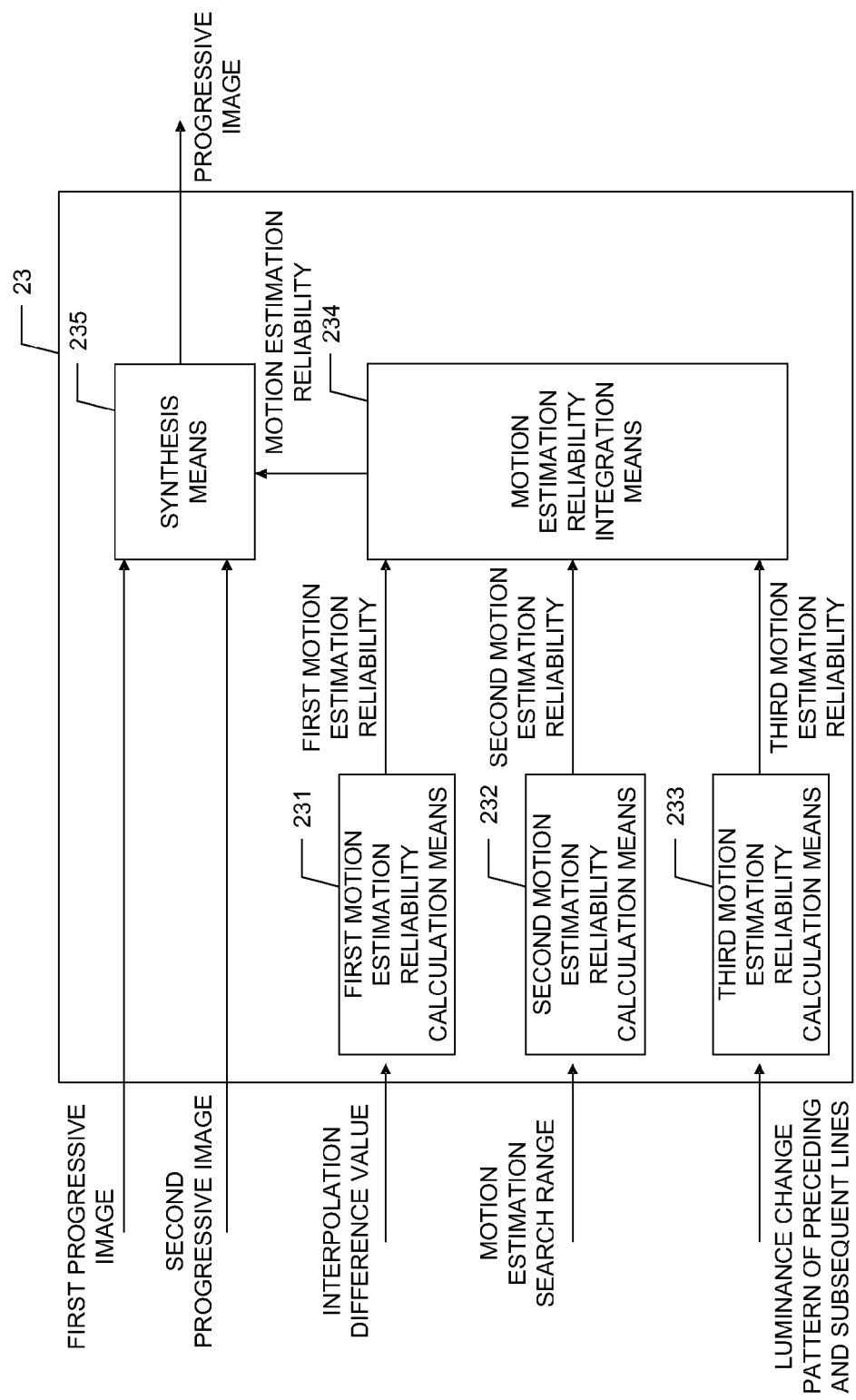
FIG. 3 is a block diagram illustrating the configuration of a progressive image synthesis means in a best mode for carrying out the first invention.

The progressive image synthesis means 23 receives a first progressive image, a second progressive image, an interpolation difference value, a motion estimation search range, and luminance change patterns of preceding and subsequent lines and then outputs a progressive image obtained by synthesizing a first progressive image and a second progressive image. Referring to FIG. 3, the progressive image synthesis means 23 consists of a first motion estimation reliability calculation means 231, a second motion estimation reliability calculation means 232, a third motion estimation reliability calculation means 233, and a motion estimation reliability integration means 234, a synthesis means 235.

The first motion estimation reliability calculation means 231 receives an interpolation difference value for each interpolated pixel and calculates and outputs a first motion estimation reliability meaning a motion estimation reliability based on the interpolation difference value. The interpolation difference value is a factor representing the similarity of a pixel utilized to interpolate preceding and subsequent lines in correspondence relation. The smaller the interpolation difference value, the higher the similarity, so that the probability that the motion estimation is performed accurately is high. The larger the interpolation difference value, the smaller the similarity, so that the probability that the motion estimation is performed accurately is low. Therefore, the first motion estimation reliability calculation means 231 outputs the first motion estimation reliability which has a larger value with a decrease in interpolation difference value and outputs the first motion estimation reliability which has a smaller value with an increase in interpolation difference value.

An example of calculating a first motion estimation reliability will be explained here. For the interpolation pixel (x,y), the first motion estimation reliability $r1(x,y)$ is calculated from the interpolation difference value $s(x,y)$, using the equation (9).

[Equation 9]

$$r1(x, y) = \begin{cases} (1-r10)\frac{T1-s(x,y)}{T1}+r10 & \text{if } (s(x,y) \le T1) \\ 1.0 & \text{else} \end{cases} \quad (9)$$

where $r10(0 \le r10 \le 1.0)$ is a fixed real value given preliminarily. T1 is a real threshold value given preliminarily to indicate the range of an interpolation difference value in which the first motion estimation reliability has a maximum value of 1.0.

In place of using the equation (9), the method can be utilized of preparing a table, in which interpolation difference values are associated with first motion estimation reliabilities, is prepared previously, and referring to the table, and reading out a first motion estimation reliability corresponding to an input interpolation difference values $s(x,y)$.

The first motion estimation reliability calculation method should not be limited to only depending on the equation (9) because it is better if showing the relationship between interpolation difference value and motion estimation reliability.

Executing motion estimation over a broader search range means using more information. Executing motion estimation over a narrower search range means using relatively less information.

In the nature of the second progressive image calculation means 22, since the luminance change around interpolated pixels is relatively monotonously, the motion estimation can be easily executed accurately over a broader search range. In the case of a narrower search range, since the luminance change around interpolated pixels is complex, executing the motion estimation accurately is relatively difficult. That is, when motion estimation is performed over a broader search range, the reliability of motion vector estimation is high. When motion estimation is performed over a narrower search range, the reliability of motion vector estimation is low.

In the present invention, attention is given to the characteristic that there is a correlation between the extent of a motion estimation search range and the motion estimation reliability. The second motion estimation reliability calculation means 232 outputs a second motion estimation reliability having a larger value when the input motion estimation search range is broader and a second motion estimation reliability having a smaller value when the input motion estimation search range is narrower.

AS to the interpolated pixel (x,y), the second motion estimation reliability $r2(x,y)$ is calculated from the motion estimation search range $\rho(x,y)$ in the interpolated pixel (x,y), using the equation (10).

[Equation 10]

$$r2(x, y) = \begin{cases} (1-r20)\frac{p(x,y)}{T2}+r20 & \text{if } (p(x,y) \le T1) \\ 1.0 & \text{else} \end{cases}$$

where $r20(0 \le r10 \le 1.0)$ is a fixed real value given preliminarily. T2 is a real threshold value given preliminarily to indicate the motion estimation search range $\rho$ in which the second motion estimation reliability becomes a maximum value of 1.0.

In place of using the equation (10), the method can be utilized of preparing preliminarily a table, in which motion estimation search ranges $\rho$ are associated with the second motion estimation reliability, and referring to the table, and reading out the second motion estimation reliability corresponding to an input motion estimation search range $\rho(x,Y)$.

The second motion estimation reliability calculation method should not be limited to only depending on the equation (10) because it is better if the relationship between the extent of the motion estimation search range and motion estimation reliability are shown merely.

The third motion estimation reliability calculation means 233 receives luminance change patterns of preceding and subsequent lines within a search range for each interpolated pixel and outputs the third motion estimation reliability, which is a motion estimation reliability calculated based on the luminance change patterns.

Accurate motion estimation can be performed more easily when a luminance change around interpolated pixels is monotonously but becomes more difficult when a luminance change around interpolated pixels is complex. Moreover, the characteristic is that a similar changing mode of luminance of the preceding and subsequent lines enables an execution of accurate motion estimation. A dissimilar changing mode of luminance of the preceding and subsequent lines makes difficult an execution of accurate motion estimation. Moreover, when a change in luminance of one of preceding and subsequent lines has a flat characteristic, an image quality collapse of interpolated pixels within the second progressive image occurs hardly.

In the Present invention, an attention is given to the property that there is the correlation between luminance change patterns of preceding and subsequent lines and motion estimation reliabilities. The third motion estimation reliability calculation means 233 outputs a third motion estimation reliability based on four luminance change patterns of upper and lower lines. The third motion estimation reliability has a value satisfying (third motion estimation reliability when one line has flat characteristic)≥(third motion estimation reliability when both characteristics increase or decrease monotonously in the same direction)≥(third motion estimation reliability which both characteristics are convex in the same direction) ≥(motion estimation reliability when one characteristic decreases and increases and the other characteristic is convex).

For the interpolated pixel (x,y), there is one of methods for obtaining the third motion estimation reliability r3($x,y$) from the luminance change patterns k(x,Y) of preceding and subsequent lines. That is, the method is cited of preparing preliminarily a table, in which luminance change patterns of upper and lower lines are associated with the third motion estimation reliability, and referring to the table, and reading out the third motion estimation reliability corresponding to the input luminance change patterns k(x,y) of upper and lower lines. The table that has the correspondences between luminance change patterns of preceding and subsequent lines and the third motion estimation reliability may be adjustable externally.

The motion estimation reliability integration means 234 receives the first motion estimation reliability output from the first motion estimation reliability calculation means 231, the second motion estimation reliability output from the second motion estimation reliability calculation means 232, and the third motion estimation reliability output from the third motion estimation reliability calculation means 233, to calculate a motion estimation reliability.

In one method, the motion estimation reliability r(x,y) of an interpolated pixel (x2,y2) is obtained by the equation (11), which includes the first motion estimation reliability r1($x,y$) in (x,y) and the second motion estimation reliability r2($x,y$) in (x,y) and the third motion estimation reliability r3($x,y$) in (x,y).

[Equation 11]

$$r(x,y)=r1(x,y)r2(x,y)r3(x,y) \qquad (11)$$

Alternatively, the motion estimation reliability r(x,y) may be obtained by a weighted average of r1($x,y$), r2($x,y$) and r3($x,y$), as shown in the equation (12).

[Equation 12]

$$r(x, y) = \frac{w1 r1(x, y) + w2 r2(x, y) + w3 r3(x, y)}{w1 + w2 + w3} \qquad (12)$$

where w1, w2 and w3 are real part synthesis weight coefficients, respectively, each which may be a fixed value set previously or may be adjustable externally.

The synthesis means 235 receives a first progressive image, a second progressive image, and a motion estimation reliability, and then performs the synthesis operation based on them. In the synthesis of the first progressive image and the second progressive image, the higher the motion estimation reliability, the larger the synthesis weight of the second progressive image whereas the lower the motion estimation reliability, the smaller the synthesis weight of the second progressive image.

In one method for obtaining a pixel value Fp(x,y,t) of an output progressive image for an interpolated pixel (x,y) at the time t, Fp(x,y,t) is calculated using the equation (13), which includes the pixel value Fp1($x,y,t$) of a first progressive image in the interpolated pixel (x,y) and the pixel values Fp2($x,y,t$) and r(x,y) of a second progressive image.

[Equation 13]

$$Fp(x,y,t)=(1.0-r(x,y))FP1(x,y,t)+r(x,y)Fp2(x,y,t) \qquad (13)$$

The method for obtaining the pixel value Fp(x,y,t) of an output progressive image for the interpolated pixel (x,y) at the time t should not be limited to only the procedure based on the equation (13). If synthesis is carried out using the pixel value Fp1($x,y,t$) of the first progressive image, the pixel value Fp2($x,y,t$) of the second progressive image, and the motion estimation reliability r(x,y), other methods are applicable.

Figure 4:
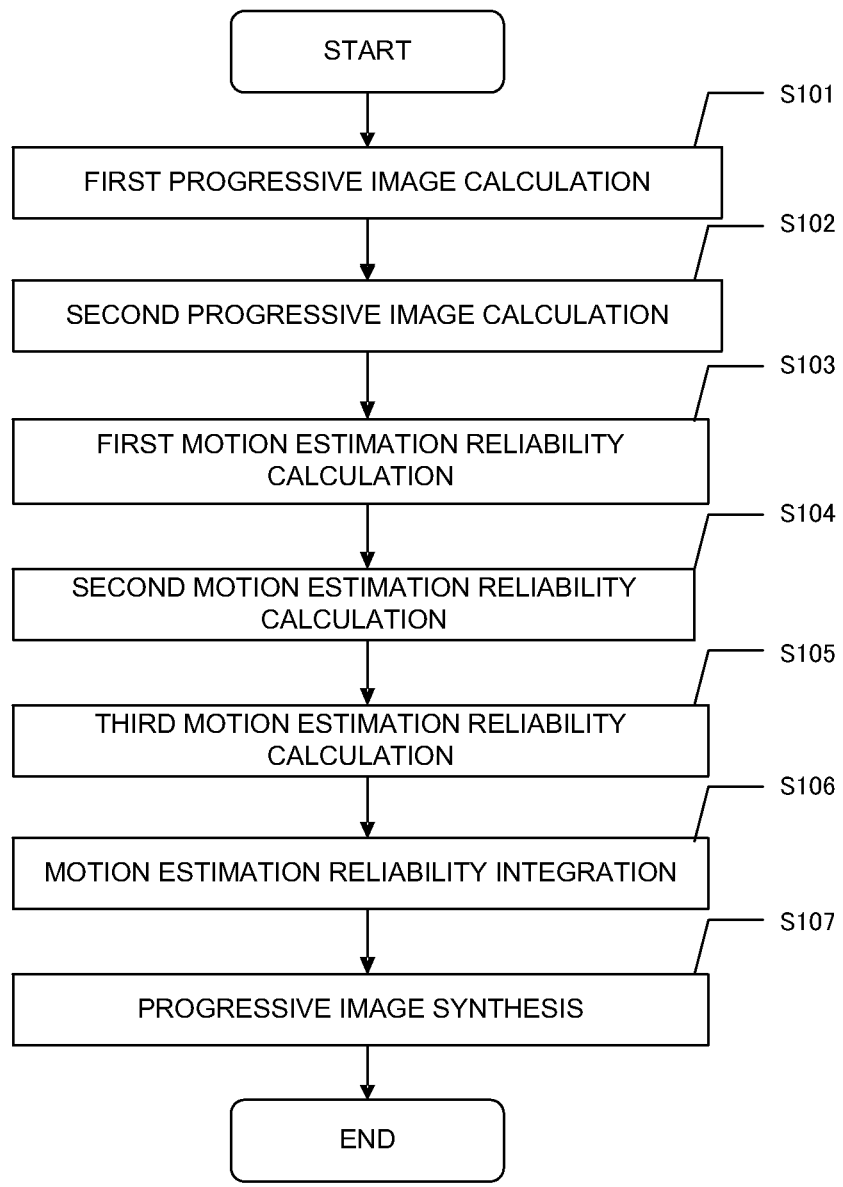
FIG. 4 is a flow chart illustrating a best mode operation for carrying out the first invention.

Next, an image processing apparatus according to the first embodiment of the present invention will be explained by referring to the flow chart shown in FIG. 4.

An interlaced image at the time t is input and interpolated to generate a first progressive image (step S101).

Interlaced images at the time (t−1), t, and (t+1) are input and a second progressive image is generated based on motion vectors (step S102).

The first motion estimation reliability is calculated from the interpolation difference value (step S103).

The second motion estimation reliability is calculated from the extent (width) of a motion estimation search range (step S104).

The third motion estimation reliability is calculated from luminance change patterns of preceding and subsequent lines within a motion estimation search range (step S105).

The motion estimation reliability of an interested interpolated pixel is obtained based on the first motion estimation reliability, the second motion estimation reliability, and the third motion estimation reliability (step S106).

The first progressive image and the second progressive image are synthesized based on the motion estimation reliability (step S107).

According to the present embodiment, a synthesis weight for synthesizing a first progressive image and a second progressive image can be suitably set using a high precision motion estimation reliability. The high precision motion estimation reliability is obtained by integrating a first motion estimation reliability calculated from an interpolation difference value, a second motion estimation reliability calculated from a motion estimation search range, and a third motion estimation reliability calculated from luminance change patterns of preceding and subsequent lines. By doing so, high quality progressive images can be generated.

Second Embodiment

Figure 5:
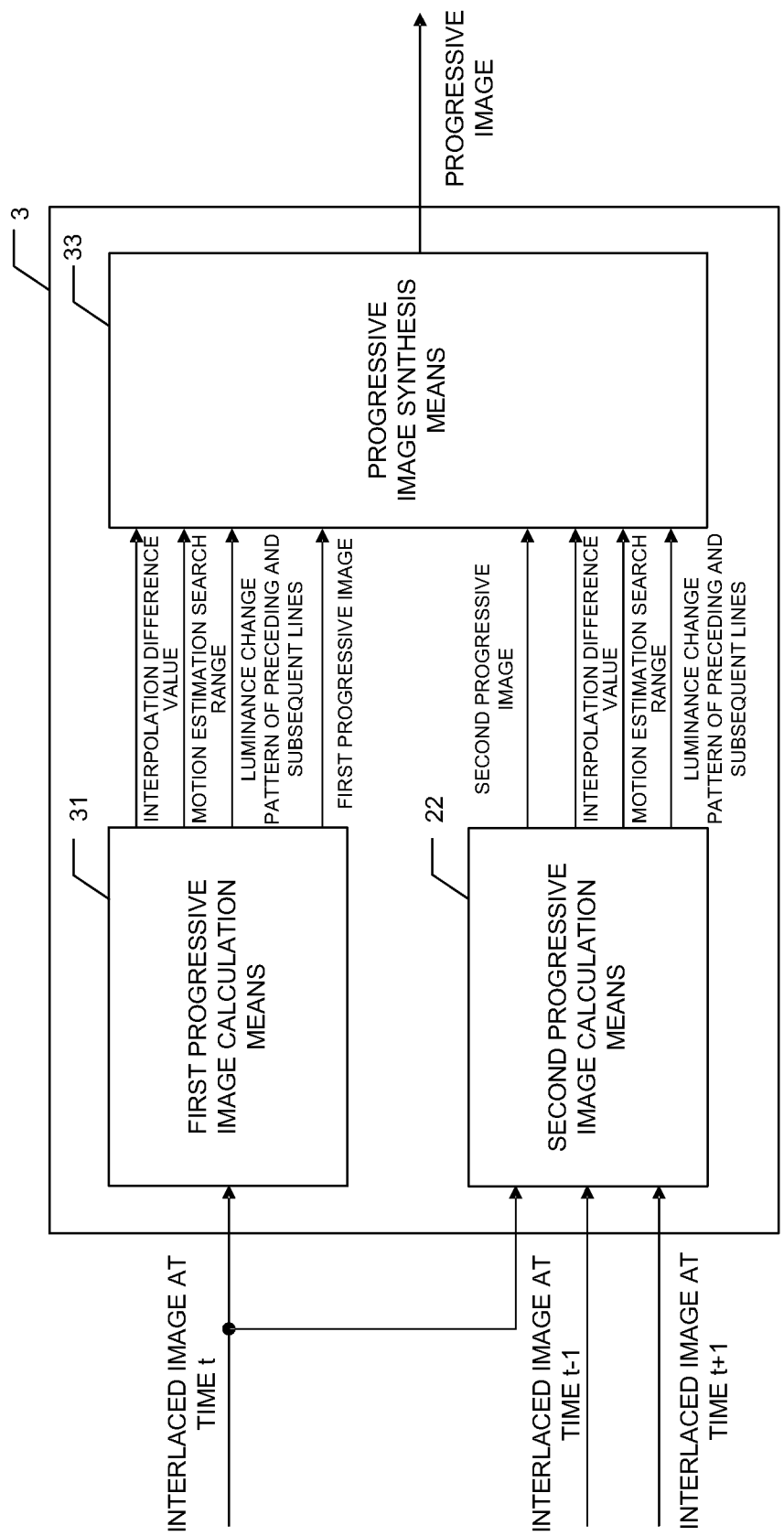
FIG. 5 is a block diagram illustrating a best mode configuration for carrying out a second invention.

FIG. 5 is a block diagram illustrating the configuration of an image processing apparatus 3 according to the second embodiment of the present invention. The image processing apparatus 3 comprises a first progressive image calculation means 31, a second progressive image calculation means 22, and a progressive image synthesis means 33.

The image processing apparatus 3 differs from the image processing apparatus 2 in the configuration of the first progressive image calculation means 31 and the progressive image synthesis means 33. The operation of both the first progressive image calculation means 31 and the progressive image synthesis means 33 will be explained below.

The first progressive image calculation means 31 receives an interlaced image at the time t and generates a first progressive image, using the procedure described in the non-patent document 2. In the non-patent document 2, luminance change patterns of upper and lower lines are calculated based on luminance changes about interpolated pixels and edge adaptive interpolation is executed after an optimum search range is obtained. The first progressive image calculation means 31 outputs an interpolated difference pixel for each interpolated pixel, luminance change patterns of upper and lower lines, and search ranges, which are obtained by the procedure in the non-patent document 2, as well as an interpolated first progressive image, which is an output obtained by the conventional procedure.

The progressive image synthesis means 33 receives a first progressive image, an interpolation difference value, a search range, and luminance change patterns of upper and lower lines, output from the first progressive image calculation means 31, and a second progressive image, an interpolation difference value, a search range, and luminance change patterns of preceding and subsequent lines, output from the second progressive image calculation means 22. Successively, the progressive image synthesis means 33 synthesizes the first progressive image and the second progressive image and then outputs a synthesized progressive image.

Figure 6:
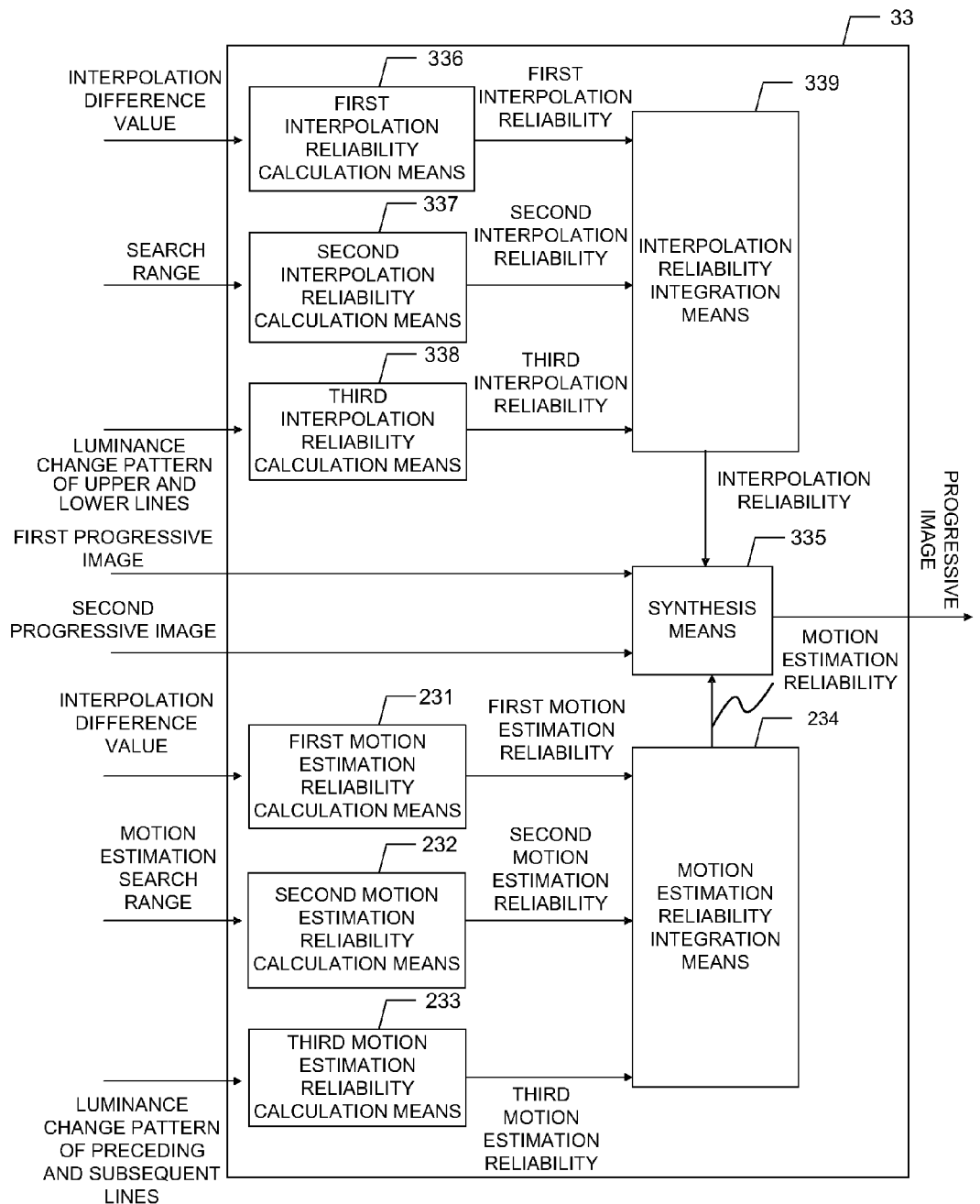
FIG. 6 is a block diagram illustrating the configuration of a progressive image synthesis means in a best mode for carrying out the second invention.

FIG. 6 is a block diagram illustrating a progressive image synthesis means 33. Referring to FIG. 6, the progressive image synthesis means 33 consists of a first motion estimation reliability calculation means 231, a second motion estimation reliability calculation means 232, a third motion estimation reliability calculation means 233, a motion estimation reliability integration means 234, a first interpolation reliability calculation means 336, a second interpolation reliability calculation means 337, a third interpolation reliability calculation means 338, an interpolation reliability integration means 339, and a synthesis means 335.

The progressive image synthesis means 33 differs from the progressive image synthesis means 23 in the image processing apparatus 2 in that the first interpolation reliability calculation means 336, the second interpolation reliability calculation means 337, the third interpolation reliability calculation means 338, the interpolation reliability integration means 339, and the synthesis means 335 are incorporated. Hereinafter, the first interpolation reliability calculation means 336, the second interpolation reliability calculation means 337, the third interpolation reliability calculation means 338, the interpolation reliability integration means 339, and the synthesis means 335 will be explained in detail on each operation.

The first interpolation reliability calculation means 336 receives an interpolation difference value for each interpolated pixel and calculates and outputs a first interpolation reliability meaning an interpolation reliability based on the interpolated difference value. The interpolation difference value is a factor representing the similarity of a pixel used to interpolate upper and lower lines related to each other. When the interpolation difference value is smaller, the similarity is high so the probability that interpolation is carried out accurately is high. When the interpolation difference value is larger, the similarity is low so the probability that interpolation is carried out accurately is low. Therefore, the first interpolation reliability calculation means 336 outputs a first interpolation reliability having a larger value when the interpolation difference value is smaller but outputs a first interpolation reliability having a smaller value when the interpolation difference value is larger.

The first interpolation reliability calculating method, which realizes the above-mentioned characteristics, will be explained below as an example. For the interpolated pixel (x,y), the first interpolation reliability $c1(x,y)$ is calculated from the interpolation difference value $s2(x,y)$, using the computation formula expressed by the equation (14).

[Equation 14]

$$c1(x, y) = \begin{cases} (1-c10)\dfrac{U1 - s2(x, y)}{U1} + C10 & \text{if } (s(x, y) \le U1) \\ 1.0 & \text{else} \end{cases} \quad (14)$$

where $c10$ ($0 \le c10 \le 1.0$) is a fixed real value given preliminarily. U1 is a real threshold value given preliminarily to show the range of an interpolation difference value, in which the first interpolation reliability has a maximum value of 1.0.

The method may be utilized of preparing a table which lists an interpolation difference value and the first interpolation reliability, preliminarily associated with each other, in place of the equation (14), referring to the table, and reading out the first interpolation reliability corresponding to the input interpolation difference value $S2(x,y)$.

The first interpolation reliability calculation method can be executed by merely showing the relation between the interpolation difference value and the interpolation reliability and therefore should not be limited to depending on the equation (14).

For interpolation of an interlaced image, executing the edge adaptive interpolation over a broad search range means interpolating using more information. Executing the edge adaptive interpolation over a narrow search range means executing interpolation using relatively less information. For example, in the edge adaptive interpolation according to the procedure described in the non-patent document 2, the edge adaptive interpolation over a broad search range allows executing accurate interpolation because a luminance change around an interpolated pixel is relatively monotonous. Moreover, the edge adaptive interpolation over a narrow search range makes accurate interpolation relatively difficult because a luminance change around an interpolated pixel is complex. That is, it can be said that an interpolation process over a broader search range leads to high interpolation reliability thereof but that an interpolation process over a narrower search range leads to low interpolation reliability thereof.

Therefore, in the present invention, attention is given to a correlation between and the size of the search range and interpolation reliability. The second interpolation reliability calculation means 337 outputs a second interpolation reliability of a large value when an input search range is broader and outputs a second interpolation reliability of a small value when an input search range is narrower.

As to the interpolated pixel (x,y), the second interpolation reliability $c2(x,y)$ is calculated based on the search range $\Phi(x,y)$ of an interpolated pixel (x,y), using the equation (15).

[Equation 15]

$$c2(x, y) = \begin{cases} (1 - c20)\dfrac{\phi(x, y)}{U2} + c20 & \text{if } (\phi(x, y) \leq U2) \\ 1.0 & \text{else} \end{cases} \quad (15)$$

where c20 (0≤c20≤1.0) is a fixed real value given preliminarily. U2 is a real threshold value given preliminarily to show a search range Φ in which the second interpolation reliability has a maximum value of 1.0.

The method may be utilized of preparing a table including the search range and the second interpolation reliability, associated preliminarily with each other, in place of the equation (15), referring to the table, and reading out the second interpolation reliability corresponding to the input search range Φ(x,y).

The second interpolation reliability calculation method can be executed by merely showing the relation between the search range and the interpolation reliability and should not be limited to depending on only the equation (15).

The third interpolation reliability calculation means 338 receives luminance change patterns of upper and lower lines within a search range for each pixel interpolated and outputs as a third interpolation reliability an interpolation reliability calculated based on the luminance change patterns of the upper and lower lines.

In the case of interpolating an interlaced image, when a luminance change around an interpolated pixel is more monotonous, it becomes more easily to interpolate an interlaced image accurately. Meanwhile, when the luminance change around an interpolated pixel is more complex, it becomes difficult to interpolate an interlaced image accurately. When the tendencies of luminance changes of upper and lower lines are similar to each other, it becomes more easily to interpolate an interlaced image accurately. When the tendencies of luminance changes of upper and lower lines are dissimilar to each other, it becomes more difficult to interpolate an interlaced image accurately. Moreover, when a change in luminance of one line has a flat characteristic, an image quality collapse of interpolated pixels hardly occurs within the first progressive image.

In the present invention, attention is directed toward the correlation characteristic between luminance change patterns of upper and lower lines and interpolation reliabilities. The third interpolation reliability calculation means 338 outputs a third interpolation reliability in four luminance change patterns of upper and lower lines. The third interpolation reliability has values satisfying (third interpolation reliability when one characteristic is flat)≥(third interpolation reliability when both characteristics decrease and increase in the same direction)≥(third interpolation reliability when both characteristics are convex in the same direction)≥(interpolation reliability when one characteristic decreases and increases and the other characteristic is convex).

In the present invention, attention is directed to the correlation between luminance change patterns of upper and lower lines and interpolation reliabilities. The third interpolation reliability calculation means 338 outputs the third interpolation reliability according to four patterns of luminance change, based on the luminance change patterns of upper and lower lines.

For the interpolated pixel (x,y), as one method for obtaining third interpolation reliability $c3(x,y)$ from luminance change patterns $k2(x,y)$ of upper and lower lines, there is the method of preparing a table including luminance change patterns of upper and lower lines and the third interpolation reliability, associated with each other preliminarily, referring to the table, and reading out the third interpolation reliability corresponding to input luminance change patterns $k2(x,y)$ of upper and lower lines. The table including luminance change patterns of upper and lower lines and the third interpolation reliability, associated with each other, may be adjusted externally.

The interpolation reliability integration means 339 receives the first interpolation reliability output from the first interpolation reliability calculation means 336, the second interpolation reliability output from the second interpolation reliability calculation means 337, and the third interpolation reliability output from the third interpolation reliability calculation means 338 and then calculates an interpolation reliability.

In one method for obtaining the interpolation reliability c(x,y) for the interpolated pixel (x,y), the interpolation reliability is given by the equation (15), together with the first interpolation reliability $c1(x,y)$ at (x,y), the second interpolation reliability $c2(x,y)$ at (x,y), and the third interpolation reliability $c3(x,y)$ at (x,y).

[Equation 16]

$$c(x,y) = c1(x,y)c2(x,y)c3(x,y) \quad (16)$$

Alternatively, the interpolation reliability may be obtained by a weighted average of $c1(x,y)$, $c2(x,y)$ and $c3(x,y)$, as shown in the equation (17)

[Equation 17]

$$c(x, y) = \frac{w1'c1(x, y) + w2'c2(x, y) + w3'c3(x, y)}{w1' + w2' + w3'} \quad (17)$$

where real synthesis weight coefficients w1', w2', and w3' may be fixed values set preliminarily, respectively, and may be adjusted externally.

Figure 9:
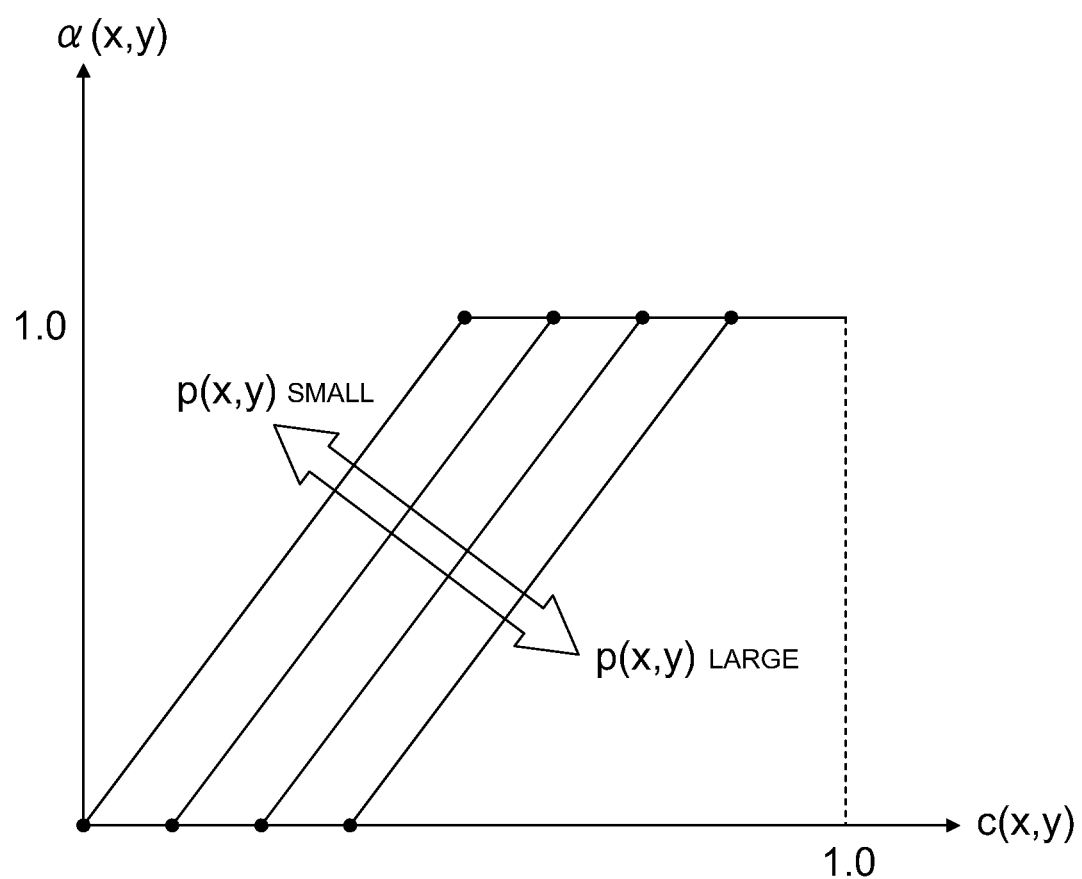
FIG. 9 is a graph for obtaining synthesis weights.
Figure 10:
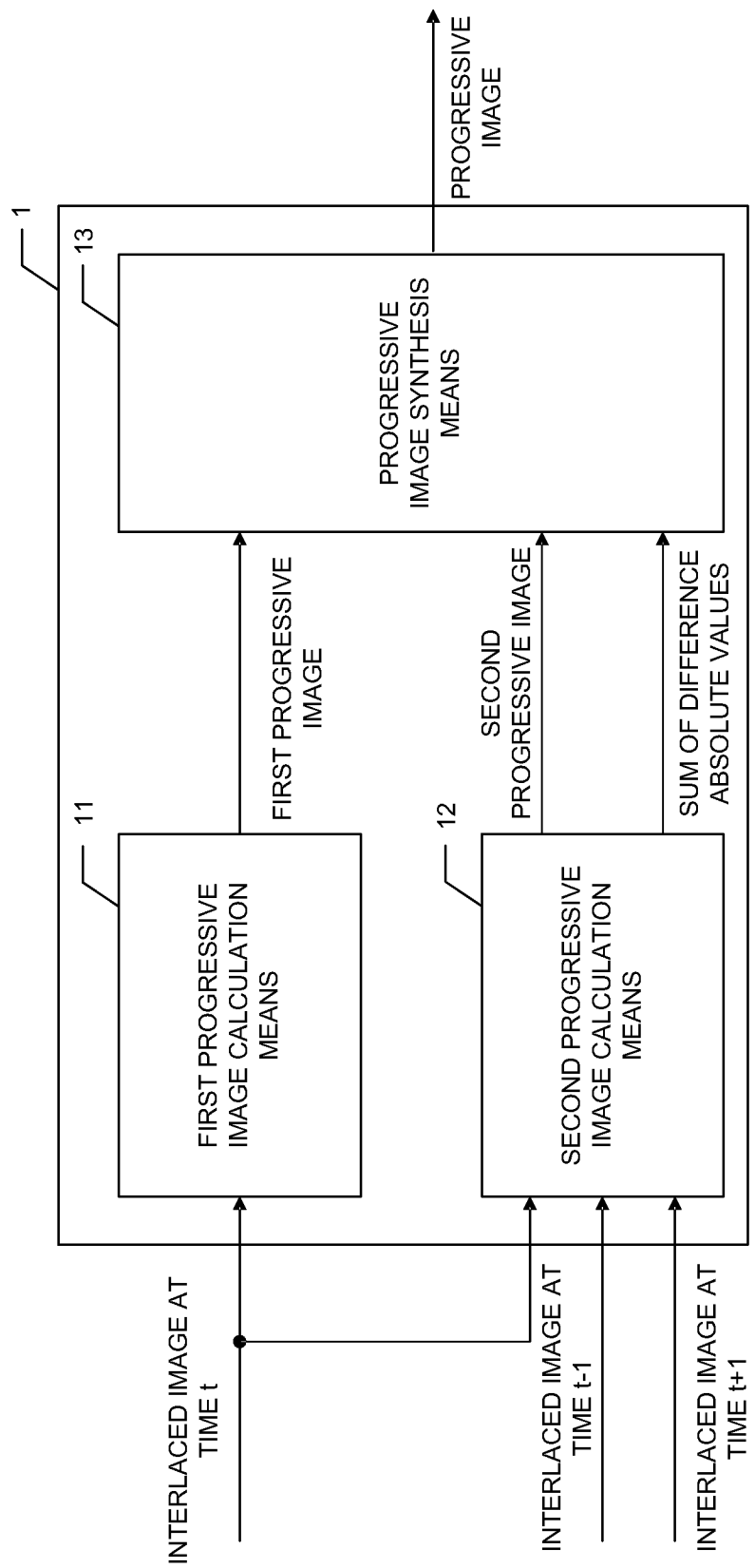
FIG. 10 is a block diagram illustrating the configuration in a related technology.

The synthesis means 335 receives a first progressive image, a second progressive image, an interpolation reliability, and a motion estimation reliability and performs synthesis based on synthesis weights according to respective inputs. As an example of the method for calculating a synthesis weight α(x,y) at the coordinate (x,y), there is the method of calculating the synthesis weight in such a way that α(x,y) increases with a decrease of the motion estimation reliability p(x,y) and that α(x,y) increases with an increase of the interpolation reliability c(x,y), see the graph of FIG. 9. The synthesis means 335 synthesizes the first progressive image and the second progressive image, according to the equation (18), based on α(x,y) calculated for the interpolated pixel at the coordinate (x,y).

[Equation 18]

$$Fp(x,y,t) = \alpha(x,y)Fp1(x,y,t) + (1.0 - \alpha(x,y))Fp2(x,y,t) \quad (18)$$

Figure 7:
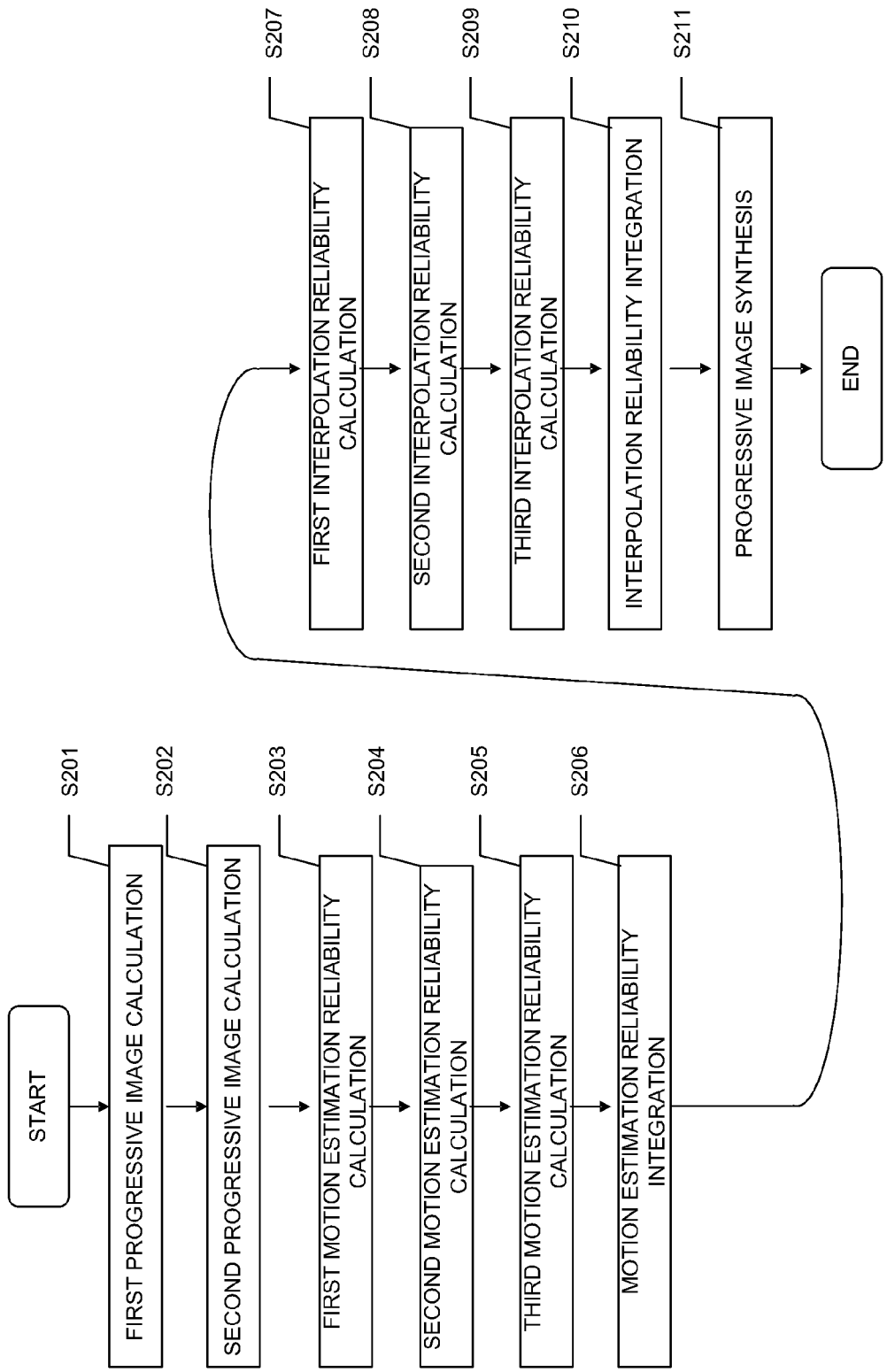
FIG. 7 is a flow chart illustrating a best mode operation for carrying out the second invention.
Figure 8:
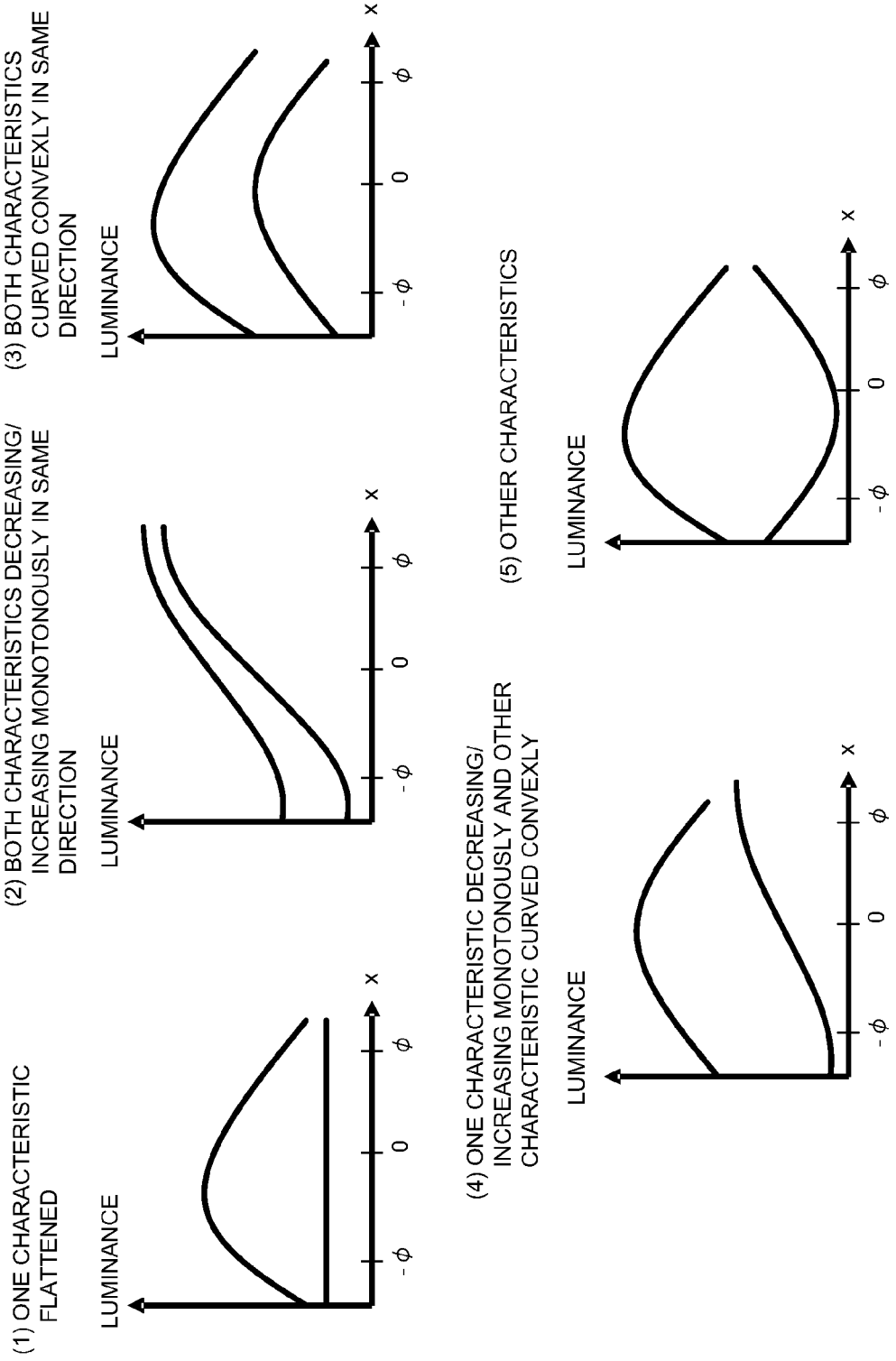
FIG. 8 is a diagram explaining luminance change patterns in luminance on upper and lower lines.

Next, an image processing method according to the second embodiment of the present invention will be explained below by referring to the flowchart of FIG. 7.

An interlaced image is received at the time t and is interpolated to generate a first progressive image (step S201).

Interlaced images at the time t−1, t and t+1 are received and a second progressive image is generated based on motion vectors (step S202).

In the first motion estimation reliability calculation, a first motion estimation reliability is obtained from an interpolated difference value (step S203).

In the second motion estimation reliability calculation, a second motion estimation reliability is obtained based on the extent (or width) of motion estimation search range (step S204).

In the third motion estimation reliability calculation, a third motion estimation reliability is obtained based on the luminance change patterns of preceding and subsequent lines within a motion estimation search range (step S205).

In the motion estimation reliability calculation, the motion estimation reliability of an interested interpolated pixel is obtained based on the first motion estimation reliability, the second motion estimation reliability, and the third motion estimation reliability (step S206).

In the first interpolation reliability calculation, a first interpolation reliability is obtained from an interpolation difference value (step S207).

In the second interpolation reliability calculation, a second interpolation reliability is obtained from the extent of a search range (step S208).

In the third interpolation reliability calculation, a third interpolation reliability is obtained from luminance change patterns of preceding and subsequent lines within the search range (step S209).

In the interpolation reliability calculation, the interpolation reliability of an interested interpolated pixel is obtained based on the first interpolation reliability, the second interpolation reliability, and the third interpolation reliability (step S210).

Both the first progressive image and the second progressive image are synthesized based on the motion estimation reliability and based on the interpolation reliability (step S211).

According to the image processing apparatus in the first embodiment and the image processing method in the second embodiment, in the present invention, the motion estimation reliability is calculated by integrating the first, second and third motion estimation reliabilities. However, the motion estimation reliability may be calculated by utilizing only the second motion estimation reliability or the third motion estimation reliability. The motion estimation reliability may be calculated by integrating the first motion estimation reliability and the second motion estimation reliability. Moreover, the motion estimation reliability may be calculated by integrating the first motion estimation reliability and the third motion estimation reliability. Such embodiments can be realized easily by setting the motion vector reliability value, omitted in the equation (11) or (12), to a fixed value of 1.0.

In the method of calculating a motion estimation reliability based on only the second motion estimation reliability, the motion estimation reliability reflecting easiness of accurate motion vector estimation discriminated from the extent of a search range can be calculated. The image quality of a progressive image to be generated can be improved by decreasing the synthesis weight of the second progressive image of an interpolated pixel of which accurate motion vector estimation is difficult because of plural similar areas.

In the method of calculating a motion estimation reliability from only the third motion estimation reliability, the motion estimation reliability reflecting easiness of accurate motion vector estimation discriminated according complicated luminance changes around interpolated pixels found from luminance change patterns of preceding and subsequent lines can be calculated. The image quality of a progressive image to be generated can be improved by decreasing the synthesis weight of the second progressive image of an interpolated pixel, of which accurate motion vector estimation is difficult because of complicated luminance changes.

In the method of calculating a motion estimation reliability through integrating the first motion estimation reliability and the second motion estimation reliability, the motion estimation reliability can be calculated in consideration of the similarity of pixels utilized for interpolation of preceding and subsequent lines associated with each other, in addition to easiness of accurate motion vector estimation discriminated from the breadth of a search range. As a result, the image quality of a progressive image to be generated can be further improved.

Similarly, in the method of calculating a motion estimation reliability through integrating the first motion estimation reliability and the third motion estimation reliability, the motion estimation reliability can be calculated in consideration of the similarity of pixels utilized for interpolation of preceding and subsequent lines associated with each other, in addition to easiness of accurate motion vector estimation discriminated from luminance change patterns of preceding and subsequent lines. As a result, the image quality of a progressive image to be generated can be further improved.

Furthermore, in the image processing apparatus in the first embodiment and the image processing method in the second embodiment, according to the present invention, interlaced images may be input at a different time, such as the time t−3, t, or t+3, to generate the second progressive image, unlike the case where the interlaced images are input at the time t−1, t, or t+1. The second progressive image, for example, in which interlaced images at the time t−3, t, and t+3 are input, can be generated by changing t−1 into t−3 and t+1 into t+3 in the equations (7) and (8). Moreover, the second progressive image, for example, in which interlaced images at the time t−1, t, and t+3 are input, can be generated by using the following equations (19) and (20), instead of the equations (7) and (8).

[Equation 19]

$$Fp2(x, y, t) = \frac{Fi(x - n/2, y, t - 1) + Fi(x + n, y, t - 3)}{2} \quad (19)$$

[Equation 20]

$$Sub2(q) = |Fi(x - q/2, y, t - 1) - Fi(x + q, y, t + 3)| \quad (20)$$

In the embodiments of the present invention, a progressive image is generated from three interlaced image frames but may be generated from plural interlaced image frames, or four or more interlaced image frames. For example, when five interlaced image frames at the time t−3, t−1, t, t+1, and t+3 are input, a progressive image can be easily generated by synthesizing the first progressive image, the second progressive image generated from interlaced images at the time t−1, t, and t+1, and the second progressive image generated from interlaced images at the time t−3, t, and t+3, based on respective motion estimation reliabilities.

In the embodiments described above, the first progressive image calculation means 11 and 31, the second progressive image calculation means 12, the progressive image synthesis means 13, the second progressive image calculation means 22, progressive image synthesis means 23 and 33, and the like are configures of hardware, respectively. However, each element may be configured of a computer running under program control, such as central processing unit, processor, or data processing unit.

The 1st mode of the present invention is characterized in that an image processing method comprising the step of: calculating a synthesis ratio based on a motion estimation reliability, said synthesis ratio being used when a first progressive image generated from an interlaced image at a certain time and a second progressive image generated from plural interlaced images at a time different from said certain time are synthesized, said motion estimation reliability being decided by integrating a first motion estimation reliability, a second motion estimation reliability, and a third motion estimation reliability, said first motion estimation reliability being decided by a difference absolute value between pixels within an interlaced image at a preceding time and pixels within an interlaced image at a subsequent time, used to calculate a pixel value interpolated when said second progressive image is generated, said second motion estimation reliability being decided by the widths of areas of interlaced images at preceding and subsequent times used to calculate said pixel values to be interpolated, said third motion estimation reliability being decided by a combination of a line luminance change of an interlaced image at a preceding time and a line luminance change of an interlaced signal at a subsequent time within said area.

The 2nd mode of the present invention, in the above-mentioned mode, is characterized in that the image processing method further comprising the step of: calculating said synthesis ratio based on a motion estimation reliability and based on an interpolation reliability; said motion estimation reliability being decided by integrating said first motion estimation reliability, said second motion estimation reliability, and said third motion estimation reliability, said interpolation reliability being decided by integrating a first interpolation reliability, a second interpolation reliability, and a third interpolation reliability; said first interpolation reliability being decided by an difference absolute value between pixels of upper and lower lines used to calculate an interpolation pixel value when said first progressive image is generated, said second interpolation reliability being decided by the width of an area used to decide pixels of said upper and lower line used to calculate said pixel value to be interpolated, said third interpolation reliability being decided by combining a luminance change of said upper line and a luminance change of said lower line within said area.

The 3rd mode of the present invention, in the above-mentioned mode, is characterized in that the synthesis ratio of said second progressive image becomes higher when said motion estimation reliability is high.

The 4th mode of the present invention, in the above-mentioned mode, is characterized in that the synthesis ratio of said first progressive image becomes higher when said interpolation reliability is high.

The 5th mode of the present invention, in the above-mentioned mode, is characterized in that said first motion estimation reliability has a larger value when said difference absolute value is small and has a smaller value when said difference absolute value is large.

The 6th mode of the present invention, in the above-mentioned mode, is characterized in that said second motion estimation reliability has a larger value when said area is broad and has a smaller value when said area is narrow.

The 7th mode of the present invention, in the above-mentioned mode, is characterized in that said third motion estimation reliability has a larger value when a line luminance change pattern of an interlaced image at said preceding time and a line luminance change pattern of an interlaced image at said subsequent time are simple and has a smaller value when a line luminance change pattern of an interlaced image at said preceding time and a line luminance change pattern of an interlaced image at said subsequent time are complex.

The 8th mode of the present invention, in the above-mentioned mode, is characterized in that said first interpolation reliability has a larger value when said difference absolute value is small and has a smaller value when said difference absolute value is large.

The 9th mode of the present invention, in the above-mentioned mode, is characterized in that said second interpolation reliability has a larger value when said area is broad and has a smaller value when said area is narrow.

The 10th mode of the present invention, in the abovementioned mode, is characterized in that said third interpolation reliability has a larger value when a luminance change pattern of an upper line is similar to a luminance change pattern of a lower line.

The 11th mode of the present invention, in the abovementioned mode, is characterized in that said third interpolation reliability has a larger value when a luminance change pattern of said upper line and a luminance change pattern of said lower line are simple and has a smaller value when a luminance change pattern of said upper line and a luminance change pattern of said lower line are complex.

The 12th mode of the present invention is characterized in that an image processing method comprising the step of: calculating a synthesis ratio based on a motion estimation reliability; said synthesis ratio being used when a first progressive image generated from an interlaced image at a certain time and a second progressive image generated from plural interlaced images at a time different from said certain time are synthesized; said motion estimation reliability being decided by the widths of areas of plural interlaced images at a different time used to calculate a pixel value to be interlaced when said second progressive image is generated.

The 13th mode of the present invention is characterized in that an image processing method comprising the step of calculating a synthesis ratio based on a motion estimation reliability; said synthesis ratio being used when a first progressive image generated from an interlaced image at a certain time and a second progressive image generated from plural interlaced images at a time different from said certain time are synthesized; said motion estimation reliability being decided by either a line luminance change of an interlaced image at a preceding time or a line luminance change of an interlaced image at a subsequent time in said area.

The 14th mode of the present invention is characterized in that an image processing apparatus comprising an image synthesis means for calculating a synthesis ratio based on a motion estimation reliability and synthesizing a first progressive image and a second progressive image based on said synthesis ratio; said synthesis ratio being used to synthesize a first progressive image generated from an interlaced image at a certain time and a second progressive image generated from plural interlaced images at a time different from said certain time, said motion estimation reliability being decided by integrating a first motion estimation reliability, a second motion estimation reliability, and a third motion estimation reliability, said first motion estimation reliability being decided by a difference absolute value between pixels within an interlaced image a preceding time and pixels within an interlaced image at a subsequent time used to calculate an pixel value to be interlaced when said second progressive image is generated, said second estimation reliability being decided by widths of areas of interlaced images at said preceding and subsequent times used to calculate said pixel value to be interlaced, said third motion estimation reliability being decided by a combination of a line luminance change of an interlaced image at a preceding time and a line luminance change of an interlaced image at a subsequent time within said area.

The 15th mode of the present invention, in the above-mentioned mode, is characterized in that said image synthesis means calculates a synthesis ratio based on a motion estimation reliability and based on an interpolation reliability; said motion estimation reliability being decided by integrating said first motion estimation reliability and said second motion estimation reliability and said third motion estimation reliability, said interpolation reliability being decided by integrating a first interpolation reliability, a second interpolation reliability, and a third interpolation reliability, said first interpolation reliability being decided by a difference absolute value between pixels of an upper line and pixels of an lower line used to calculated a pixel value to be interpolated when said first progressive image is generated; said second interpolation reliability being decided by the width of an area used to decide pixels of an upper line and pixels of an lower line used to calculate said pixel value to be interpolated, said third interpolation reliability being decided by a combination of a luminance change of an upper line and a luminance change of an lower line within said area.

The 16th mode of the present invention, in the above-mentioned mode, is characterized in that said image synthesis means calculates in such a way that said synthesis ratio of said second progressive image becomes higher when said motion estimation reliability is high.

The 17th mode of the present invention, in the above-mentioned mode, is characterized in that said image synthesis means calculates in such a way that said synthesis ratio of said first progressive image becomes higher when said interpolation reliability is high.

The 18th mode of the present invention, in the above-mentioned mode, is characterized in that said image synthesis means calculates in such a way that said first motion estimation reliability has a larger value when said difference absolute value is small and has a smaller value when said difference absolute value is large.

The 19th mode of the present invention, in the above-mentioned mode, is characterized in that said image synthesis means calculates in such a way that said second motion estimation reliability has a larger value when said area is broad and has a smaller value when of said area is narrow.

The 20th mode of the present invention, in the above-mentioned mode, is characterized in that said image synthesis means calculates in such a way that said third motion estimation reliability has a larger value when a line luminance change pattern of an interlaced image at said preceding time and a line luminance change pattern of an interlaced image at said subsequent time are simple and has a smaller value when a line luminance change pattern of an interlaced image at said preceding time and a line luminance change pattern of an interlaced image at said subsequent time are complex.

The 21st mode of the present invention, in the above-mentioned mode, is characterized in that said image synthesis means calculates in such a way that said first interpolation reliability has a larger value when said difference absolute value is small and has a smaller value when said difference absolute value is large.

The 22nd mode of the present invention, in the above-mentioned mode, is characterized in that said image synthesis means calculates in such a way that said second interpolation reliability has a larger value when said area is broad and has a smaller value when said area is narrow.

The 23rd mode of the present invention, in the above-mentioned mode, is characterized in that said image synthesis means calculates in such a way that said third interpolation reliability has a larger value when a luminance change pattern of an upper line is similar to a luminance change pattern of a lower line.

The 24th mode of the present invention, in the above-mentioned mode, is characterized in that said image synthesis means calculates in such a way that said third interpolation reliability has a larger value when a luminance change pattern of said upper line and a luminance change pattern of said lower line are simple and has a smaller value when a luminance change pattern of said upper line and a luminance change pattern of said lower line are complex.

The 25th mode of the present invention is characterized in that an image processing apparatus comprising an image synthesis means for calculating a synthesis ratio based on a motion estimation reliability and synthesizing a first progressive image and a second progressive image based on said synthesis ratio, said synthesis ratio being used when said first progressive image generated from an interlaced image at a certain time and said second progressive image generated from plural interlaced images at a time different from said certain time are synthesized, said motion estimation reliability being decided by the widths of areas of plural interlaced images at a different time used to calculate a pixel value to be interpolated when said second progressive image is generated.

The 26th mode of the present invention is characterized in that an image processing apparatus comprising an image synthesis means for calculating a synthesis ratio based on a motion estimation reliability and synthesizing a first progressive image and a second progressive image based on said synthesis ratio, said synthesis ratio being used when said first progressive image generated from an interlaced image at a certain time and said second progressive image generated from plural interlaced images at a time different from said certain time are synthesized, said motion estimation reliability being decided by either a line luminance change of an interlaced image at a preceding time or a line luminance change of an interlaced image at a subsequent time within said area.

The 27th mode of the present invention is characterized in that a program comprising the step of: directing an information processing apparatus to execute a synthesis ratio calculation process for calculating a synthesis ratio based on a motion estimation reliability; said synthesis ratio being used when a first progressive image generated from an interlaced image at a certain time and second progressive image generated from plural interlaced images at a time different from said certain time are synthesized, said motion estimation reliability being decided by integrating a first motion estimation reliability, a second motion estimation reliability and a third motion estimation reliability, said first motion estimation reliability being decided from a difference absolute value between pixels within an interlaced image at a preceding time and pixels within an interlaced image at a subsequent time, used to calculate a pixel value to be interpolated when said second progressive image is generated, said second motion estimation reliability being decided from the widths of areas of interlaced images at preceding and subsequent times used to calculate said pixel value to be interpolated, said third motion estimation reliability being decided by combining a line luminance change of an interlaced image at a preceding time and a line luminance change of an interlaced image at a subsequent time within said area.

The 28th mode of the present invention, in the above-mentioned mode, is characterized in that said synthesis ratio calculation process includes the process of: calculating a synthesis ratio based on a motion estimation reliability and based on an interpolation reliability; said motion estimation reliability being decided by integrating said first motion estimation reliability, said second motion estimation reliability, and said third motion estimation reliability, said interpolation reliability being decided by integrating a first interpolation reliability, a second interpolation reliability, and a third interpolation reliability, said first interpolation reliability being decided by a difference absolute value between pixels of an upper line and pixels of a lower line used to calculate an pixel value to be interpolated when said first progressive image is generated, said second interpolation reliability being decided by the width of an area used to decide pixels of an upper line and pixels of a lower line used to calculated said pixel value to be interpolated, said third interpolation reliability being decided by combining a luminance change of an upper line and a luminance change of a lower line within said area.

The 29th mode of the present invention, in the abovementioned mode, is characterized in that said synthesis ratio calculation process calculates in such a way that the synthesis ratio of said second progressive image becomes higher when said motion estimation reliability is high.

The 30th mode of the present invention, in the abovementioned mode, is characterized in that said synthesis ratio calculation process calculates in such a way that the synthesis ratio of said first progressive image becomes higher when said interpolation reliability is high.

The 31st mode of the present invention, in the abovementioned mode, is characterized in that said synthesis ratio calculation process calculates in such a way that said first motion estimation reliability has a larger value when said difference absolute value is small and has a smaller value when said difference absolute value is large.

The 32nd mode of the present invention, in the abovementioned mode, is characterized in that said synthesis ratio calculation process calculates in such a way that said second motion estimation reliability has a larger value when said area is broad and has a smaller value when said area is narrow.

The 33rd mode of the present invention, in the abovementioned mode, is characterized in that said synthesis ratio calculation process calculates in such a way that said third motion estimation reliability has a larger value when a line luminance change pattern of an interlaced image at said preceding time and a line luminance change pattern of an interlaced image at said subsequent time are simple and has a smaller value when a line luminance change pattern of an interlaced image at said preceding time and a line luminance change pattern of an interlaced image at said subsequent time are complex.

The 34th mode of the present invention, in the abovementioned mode, is characterized in that said synthesis ratio calculation process calculates in such a way that said first interpolation reliability has a larger value when said difference absolute value is small and has a smaller value when said difference absolute value is large.

The 35th mode of the present invention, in the abovementioned mode, is characterized in that said synthesis ratio calculation process calculates in such a way that said second interpolation reliability has a larger value when said area is broad and has a smaller value when said area is narrow.

The 36th mode of the present invention, in the abovementioned mode, is characterized in that said synthesis ratio calculation process calculates in such a way that said third interpolation reliability has a larger value when a luminance change pattern of an upper line s similar to a luminance change pattern of a lower line.

The 37th mode of the present invention, in the abovementioned mode, is characterized in that said synthesis ratio calculation process calculates in such a way that said third interpolation reliability has a larger value when said luminance change pattern of an upper line and said luminance change pattern of a lower line are simple and has a smaller value when said luminance change pattern of an upper line and said luminance change pattern of a lower line are complex.

The 38th mode of the present invention is characterized in that a program comprising the step of directing an information processing apparatus to execute a synthesis ratio calculation process of calculating a synthesis ratio based on a motion estimation reliability; said synthesis ratio being used when a first progressive image generated from an interlaced image at a certain time and a second progressive image generated from plural interlaced images at a time different from said certain time are synthesized, said motion estimation reliability being decided by the widths of areas of plural interlaced images at a different time used to calculate pixel values to be interlaced when said second progressive image is generated.

The 39th mode of the present invention, in the abovementioned mode, is characterized in that a program comprising the step of directing an information processing apparatus to execute a synthesis ratio calculation process of calculating a synthesis ratio based on a motion estimation reliability; said synthesis ratio being used when a first progressive image generated from an interlaced image at a certain time and a second progressive image generated from plural interlaced images at a time different from said certain time are synthesized, said motion estimation reliability being decided by either a line luminance change of an interlaced image at a preceding time or a line luminance change of an interlaced image at a subsequent time within said area.

The 40th mode of the present invention is characterized in that an image processing method comprising the step of: calculating a synthesis ratio based on a motion estimation reliability; said synthesis ratio being used when a first progressive image generated from an interlaced image at a certain time and a second progressive image generated from plural interlaced images at a time different from said certain time are synthesized; said motion estimation reliability being decided by the widths of areas of plural interlaced images at a different time used to calculate a pixel value to be interlaced when said second progressive image is generated, or, by either a line luminance change of an interlaced image at a preceding time or a line luminance change of an interlaced image at a subsequent time in said area.

The 41st mode of the present invention is characterized in that an image processing apparatus comprising an image synthesis means for calculating a synthesis ratio based on a motion estimation reliability and synthesizing a first progressive image and a second progressive image based on said synthesis ratio, said synthesis ratio being used when said first progressive image generated from an interlaced image at a certain time and said second progressive image generated from plural interlaced images at a time different from said certain time are synthesized, said motion estimation reliability being decided by the widths of areas of plural interlaced images at a different time used to calculate a pixel value to be interpolated when said second progressive image is generated, or, by either a line luminance change of an interlaced image at a preceding time or a line luminance change of an interlaced image at a subsequent time within said area.

The 42nd mode of the present invention is characterized in that a program comprising the step of directing an information processing apparatus to execute a synthesis ratio calculation process of calculating a synthesis ratio based on a motion estimation reliability; said synthesis ratio being used when a first progressive image generated from an interlaced image at a certain time and a second progressive image generated from plural interlaced images at a time different from said certain time are synthesized, said motion estimation reliability being decided by the widths of areas of plural interlaced images at a different time used to calculate pixel values to be interlaced when said second progressive image is generated, or, by either a line luminance change of an interlaced image at a preceding time or a line luminance change of an interlaced image at a subsequent time within said area.

Above, although the present invention has been particularly described with reference to the preferred embodiments and modes thereof, it should be readily apparent to those of ordinary skill in the art that the present invention is not always limited to the above-mentioned embodiment and modes, and changes and modifications in the form and details may be made without departing from the spirit and scope of the invention.

This application is based upon and claims the benefit of priority from Japanese patent application No. 2008-72973, filed on Mar. 21, 2008, the disclosure of which is incorporated herein in its entirety by reference.

The invention claimed is:

1. An image processing method, comprising:
   calculating, by one or more processors, a synthesis ratio based on a motion estimation reliability,
   said synthesis ratio being used when a first progressive image generated from an interlaced image at a time and a second progressive image generated from plural interlaced images at times different from said time are synthesized,
   said motion estimation reliability being decided by integrating a first motion estimation reliability, a second motion estimation reliability, and a third motion estimation reliability,
   said first motion estimation reliability being decided by a difference absolute value between pixels within a preceding interlaced image at a preceding time to said time and pixels within a subsequent interlaced image at a subsequent time to said time, used to calculate a pixel value interpolated when said second progressive image is generated,
   said second motion estimation reliability being decided by the widths of areas of the plural interlaced images at the preceding and subsequent times used to calculate said pixel values to be interpolated, and
   said third motion estimation reliability being decided by a combination of a line luminance change of the interlaced image at the preceding time and a line luminance change of the interlaced image at the subsequent time within said area.

2. The image processing method according to claim 1, further comprising:
   calculating, by the one or more processors, said synthesis ratio based on said motion estimation reliability and based on an interpolation reliability,
   said motion estimation reliability being decided by integrating said first motion estimation reliability, said second motion estimation reliability, and said third motion estimation reliability,
   said interpolation reliability being decided by integrating a first interpolation reliability, a second interpolation reliability, and a third interpolation reliability,
   said first interpolation reliability being decided by an difference absolute value between pixels of upper and lower lines used to calculate an interpolation pixel value when said first progressive image is generated,
   said second interpolation reliability being decided by the width of an area used to decide pixels of said upper and lower line used to calculate said pixel value to be interpolated, and
   said third interpolation reliability being decided by combining a luminance change of said upper line and a luminance change of said lower line within said area.

3. The image processing method according to claim 2, wherein the synthesis ratio of said first progressive image becomes higher when said interpolation reliability is high.

4. The image processing method according to claim 2, wherein said first interpolation reliability has a larger value when said difference absolute value is small and has a smaller value when said difference absolute value is large.

5. The image processing method according to claim 2, wherein said second interpolation reliability has a larger value when said area is broad and has a smaller value when said area is narrow.

6. The image processing method according to claim 2, wherein said third interpolation reliability has a larger value when a luminance change pattern of the luminance change of the upper line is similar to a luminance change pattern of the luminance change of the lower line.

7. The image processing method according to claim 2, wherein said third interpolation reliability has a larger value when a luminance change pattern of the luminance change of said upper line and a luminance change pattern of the luminance change of said lower line are simple and has a smaller value when the luminance change pattern of said upper line and the luminance change pattern of said lower line are complex.

8. The image processing method according to claim 1, wherein the synthesis ratio of said second progressive image becomes higher when said motion estimation reliability is high.

9. The image processing method according to of claim 1, wherein said first motion estimation reliability has a larger value when said difference absolute value is small and has a smaller value when said difference absolute value is large.

10. The image processing method according to claim 1, wherein said second motion estimation reliability has a larger value when said area is broad and has a smaller value when said area is narrow.

11. The image processing method according to claim 1, wherein said third motion estimation reliability has a larger value when a line luminance change pattern of the preceding interlaced image at said preceding time and a line luminance change pattern of the subsequent interlaced image at said subsequent time are simple and has a smaller value when the line luminance change pattern of the preceding interlaced image at said preceding time and the line luminance change pattern of the subsequent interlaced image at said subsequent time are complex.

12. An image processing method, comprising:
   calculating, by one or more processors, a synthesis ratio based on a motion estimation reliability,
   said synthesis ratio being used when a first progressive image generated from an interlaced image at a time and a second progressive image generated from plural interlaced images at times different from said time are synthesized, and
   said motion estimation reliability being decided by either a line brightness change of a preceding interlaced image at a preceding time to said time or a line brightness change of a subsequent interlaced image at a subsequent time to said time in regions of the plural interlaced images at the preceding and subsequent times used to calculate a pixel value to be interpolated.

13. An image processing apparatus, comprising:
an image synthesizer that calculates a synthesis ratio based on a motion estimation reliability and synthesizes a first progressive image and a second progressive image based on said synthesis ratio,
said synthesis ratio being used to synthesize a first progressive image generated from an interlaced image at a time and a second progressive image generated from plural interlaced images at times different from said time,
said motion estimation reliability being decided by integrating a first motion estimation reliability, a second motion estimation reliability, and a third motion estimation reliability,
said first motion estimation reliability being decided by a difference absolute value between pixels within a preceding interlaced image at a preceding time to said time and pixels within a subsequent interlaced image at a subsequent time to said time used to calculate a pixel value to be interlaced when said second progressive image is generated,
said second motion estimation reliability being decided by widths of areas of the plural interlaced images at said preceding and subsequent times used to calculate said pixel value to be interlaced, and
said third motion estimation reliability being decided by a combination of a line luminance change of the preceding interlaced image at the preceding time and a line luminance change of the subsequent interlaced image at the subsequent time within said area.

14. The image processing apparatus according to claim 13, wherein said image synthesizer calculates a synthesis ratio based on said motion estimation reliability and based on an interpolation reliability,
said motion estimation reliability being decided by integrating said first motion estimation reliability, said second motion estimation reliability, and said third motion estimation reliability,
said interpolation reliability being decided by integrating a first interpolation reliability, a second interpolation reliability, and a third interpolation reliability,
said first interpolation reliability being decided by a difference absolute value between pixels of an upper line and pixels of an lower line used to calculated a pixel value to be interpolated when said first progressive image is generated,
said second interpolation reliability being decided by the width of an area used to decide the pixels of the upper line and the pixels of the lower line used to calculate said pixel value to be interpolated, and
said third interpolation reliability being decided by a combination of a luminance change of the upper line and a luminance change of the lower line within said area.

15. The image processing apparatus according to claim 14, wherein said image synthesizer calculates in such a way that said synthesis ratio of said first progressive image becomes higher when said interpolation reliability is high.

16. The image processing apparatus according to claim 13, wherein said image synthesizer calculates in such a way that said synthesis ratio of said second progressive image becomes higher when said motion estimation reliability is high.

17. The image processing apparatus according to claim 13, wherein said image synthesizer calculates in such a way that said first motion estimation reliability has a larger value when said difference absolute value is small and has a smaller value when said difference absolute value is large.

18. The image processing apparatus according to claim 13, wherein said image synthesizer calculates in such a way that said second motion estimation reliability has a larger value when said area is broad and has a smaller value when of said area is narrow.

19. The image processing apparatus according to claim 13, wherein said image synthesizer calculates in such a way that said third motion estimation reliability has a larger value when a line luminance change pattern of the line luminance change of the preceding interlaced image at said preceding time and a line luminance change pattern of the line luminance change of the subsequent interlaced image at said subsequent time are simple and has a smaller value when the line luminance change pattern of the preceding interlaced image at said preceding time and the line luminance change pattern of the subsequent interlaced image at said subsequent time are complex.

20. The image processing apparatus according to claim 13, wherein said image synthesizer calculates in such a way that said first interpolation reliability has a larger value when said difference absolute value is small and has a smaller value when said difference absolute value is large.

21. The image processing apparatus according to claim 13, wherein said image synthesizer calculates in such a way that said second interpolation reliability has a larger value when said area is broad and has a smaller value when said area is narrow.

22. The image processing apparatus according to claim 13, wherein said image synthesizer calculates in such a way that said third interpolation reliability has a larger value when a luminance change pattern of an upper line is similar to a luminance change pattern of a lower line.

23. The image processing apparatus according to claim 13, wherein said image synthesizer calculates in such a way that said third interpolation reliability has a larger value when a luminance change pattern of the luminance change of said upper line and a luminance change pattern of the luminance change of said lower line are simple and has a smaller value when the luminance change pattern of said upper line and the luminance change pattern of said lower line are complex.

24. An image processing apparatus, comprising:
an image synthesizer that calculates a synthesis ratio based on a motion estimation reliability and synthesizes a first progressive image and a second progressive image based on said synthesis ratio,
said synthesis ratio being used when said first progressive image generated from an interlaced image at a time and said second progressive image generated from plural interlaced images at times different from said time are synthesized, and
said motion estimation reliability being decided by either a line brightness change of a preceding interlaced image at a preceding time to said time or a line brightness change of a subsequent interlaced image at a subsequent time to said time within regions of the plural interlaced images at the preceding and subsequent times used to calculate a pixel value to be interpolated.

25. A non-transitory computer readable storage medium storing a program causing a computer to execute a method comprising:
directing an information processing apparatus to execute a synthesis ratio calculation process for calculating a synthesis ratio based on a motion estimation reliability,
said synthesis ratio being used when a first progressive image generated from an interlaced image at a time and second progressive image generated from plural interlaced images at times different from said time are synthesized, said motion estimation reliability being decided by integrating a first motion estimation reliability, a second motion estimation reliability and a third motion estimation reliability, said first motion estimation reliability being decided from a difference absolute value between pixels within a preceding interlaced image at a preceding time to said time and pixels within a subsequent interlaced image at a subsequent time to said time, used to calculate a pixel value to be interpolated when said second progressive image is generated, said second motion estimation reliability being decided from the widths of areas of the plural interlaced images at the preceding and subsequent times used to calculate said pixel value to be interpolated, and said third motion estimation reliability being decided by combining a line luminance change of the preceding interlaced image at the preceding time and a line luminance change of the subsequent interlaced image at the subsequent time within said area.

26. The non-transitory computer readable storage medium storing a program according to claim 25, wherein said synthesis ratio calculation process calculates in such a way that the synthesis ratio of said second progressive image becomes higher when said motion estimation reliability is high.

27. The non-transitory computer readable storage medium storing a program according to claim 25, wherein said synthesis ratio calculation process calculates in such a way that said first motion estimation reliability has a larger value when said difference absolute value is small and has a smaller value when said difference absolute value is large.

28. The non-transitory computer readable storage medium storing a program according to claim 25, wherein said synthesis ratio calculation process calculates in such a way that said second motion estimation reliability has a larger value when said area is broad and has a smaller value when said area is narrow.

29. The non-transitory computer readable storage medium storing a program according to claim 25, wherein said synthesis ratio calculation process calculates in such a way that said third motion estimation reliability has a larger value when a line luminance change pattern of the line luminance change of the preceding interlaced image at said preceding time and a line luminance change pattern of the line luminance change of the subsequent interlaced image at said subsequent time are simple and has a smaller value when the line luminance change pattern of the preceding interlaced image at said preceding time and the line luminance change pattern of the subsequent interlaced image at said subsequent time are complex.

30. The non-transitory computer readable storage medium storing a program according to claim 25, wherein said synthesis ratio calculation process includes the process of:

calculating a synthesis ratio based on the motion estimation reliability and based on an interpolation reliability, said motion estimation reliability being decided by integrating said first motion estimation reliability, said second motion estimation reliability, and said third motion estimation reliability, said interpolation reliability being decided by integrating a first interpolation reliability, a second interpolation reliability, and a third interpolation reliability, said first interpolation reliability being decided by a difference absolute value between pixels of an upper line and pixels of a lower line used to calculate an pixel value to be interpolated when said first progressive image is generated, said second interpolation reliability being decided by the width of an area used to decide pixels of an upper line and pixels of a lower line used to calculated said pixel value to be interpolated, and said third interpolation reliability being decided by combining a luminance change of the upper line and a luminance change of the lower line within said area.

31. The non-transitory computer readable storage medium storing a program according to claim 30, wherein said synthesis ratio calculation process calculates in such a way that the synthesis ratio of said first progressive image becomes higher when said interpolation reliability is high.

32. The non-transitory computer readable storage medium storing a program according to claim 30, wherein said synthesis ratio calculation process calculates in such a way that said first interpolation reliability has a larger value when said difference absolute value is small and has a smaller value when said difference absolute value is large.

33. The non-transitory computer readable storage medium storing a program according to claim 30, wherein said synthesis ratio calculation process calculates in such a way that said second interpolation reliability has a larger value when said area is broad and has a smaller value when said area is narrow.

34. The non-transitory computer readable storage medium storing a program according to claim 30, wherein said synthesis ratio calculation process calculates in such a way that said third interpolation reliability has a larger value when a luminance change pattern of an upper line similar to a luminance change pattern of a lower line.

35. The non-transitory computer readable storage medium storing a program according to claim 30, wherein said synthesis ratio calculation process calculates in such a way that said third interpolation reliability has a larger value when a luminance change pattern of the luminance change of the upper line and a luminance change pattern of the luminance change of the lower line are simple and has a smaller value when said luminance change pattern of the upper line and said luminance change pattern of the lower line are complex.

36. A non-transitory computer readable storage medium storing a program causing a computer to execute a method, comprising:

directing an information processing apparatus to execute a synthesis ratio calculation process of calculating a synthesis ratio based on a motion estimation reliability, said synthesis ratio being used when a first progressive image generated from an interlaced image at a time and a second progressive image generated from plural interlaced images at times different from said time are synthesized, and said motion estimation reliability being decided by either a line brightness change of a preceding interlaced image at a preceding time to said time or a line brightness change of a subsequent interlaced image at a subsequent time to said time within regions of the plural interlaced images at the preceding and subsequent times used to calculate a pixel value to be interpolated.

* * * * *